(12) United States Patent
Amm

(10) Patent No.: US 6,714,337 B1
(45) Date of Patent: Mar. 30, 2004

(54) METHOD AND DEVICE FOR MODULATING A LIGHT BEAM AND HAVING AN IMPROVED GAMMA RESPONSE

(75) Inventor: David T. Amm, Sunnyvale, CA (US)

(73) Assignee: Silicon Light Machines, Sunnyvale, CA (US)

( * ) Notice: Subject to any disclaimer, the term of this patent is extended or adjusted under 35 U.S.C. 154(b) by 0 days.

(21) Appl. No.: 10/187,137

(22) Filed: Jun. 28, 2002

(51) Int. Cl.⁷ .................. G02B 26/00; G02B 26/08; G02B 5/18
(52) U.S. Cl. .................. 359/290; 359/237; 359/291; 359/298; 359/224; 359/572
(58) Field of Search .................. 359/290, 291, 359/298, 295, 224, 318, 572, 573, 237

(56) References Cited

U.S. PATENT DOCUMENTS

| | | |
|---|---|---|
| 1,525,550 A | 2/1925 | Jenkins |
| 1,548,262 A | 8/1925 | Freedman |
| 1,814,701 A | 7/1931 | Ives |
| 2,415,226 A | 2/1947 | Sziklai |
| 2,783,406 A | 2/1957 | Vanderhooft |
| 2,920,529 A | 1/1960 | Blythe |
| 2,991,490 A | 7/1961 | Grey et al. |
| 3,256,565 A | 6/1966 | Weissenstern et al. |
| 3,388,301 A | 6/1968 | James |
| 3,443,871 A | 5/1969 | Chitayat |
| 3,553,364 A | 1/1971 | Lee ..................... 359/230 |
| 3,576,394 A | 4/1971 | Lee ..................... 348/740 |
| 3,600,798 A | 8/1971 | Lee |
| 3,656,837 A | 4/1972 | Sandbank |
| 3,657,610 A | 4/1972 | Yamamoto et al. |
| 3,693,239 A | 9/1972 | Dix |
| 3,743,507 A | 7/1973 | Ih et al. |
| 3,752,563 A | 8/1973 | Torok et al. |
| 3,781,465 A | 12/1973 | Ernstoff et al. |
| 3,783,184 A | 1/1974 | Ernstoff et al. |

(List continued on next page.)

FOREIGN PATENT DOCUMENTS

| | | | |
|---|---|---|---|
| EP | 0 306 308 A2 | 3/1989 | |
| EP | 0 477 566 A2 | 4/1992 | ............ G02B/26/08 |
| EP | 0 499 566 A2 | 8/1992 | ............ G06F/3/033 |
| EP | 0 528 646 A1 | 2/1993 | ............ G09G/3/02 |
| EP | 0 610 665 A1 | 8/1994 | ............ G09F/3/34 |
| EP | 0 658 868 A1 | 6/1995 | ............ G09G/3/34 |
| EP | 0 658 830 A1 | 12/1995 | ............ G09G/3/34 |

(List continued on next page.)

OTHER PUBLICATIONS

R. Apte, F. Sandejas, W. Banyai, D. Bloom, "Grating Light Valves for High Resolution Displsay", Solid State Sensors and Actuators Workshop, Hilton Head Island, SC (Jun. 1994).

R. Apte, Grating Light Valves for High Resolution Displays, Ph.D. Dissertation, Stanford University, Jun., 1994.

(List continued on next page.)

*Primary Examiner*—Georgia Epps
*Assistant Examiner*—Jack Dinh
(74) *Attorney, Agent, or Firm*—Haverstock & Owens LLP

(57) ABSTRACT

An apparatus having an improved, tunable gamma response is disclosed. The apparatus comprises a light modulator having a plurality of spaced-apart elements, composed of alternating active elements and passive elements lying in a single plane; a gamma controller; and a displacement controller. The gamma controller applies a gamma voltage to a substrate, displacing the plurality of spaced-apart elements to a bias plane, closer to the substrate. In a reflection mode, the plurality of spaced-apart elements function as a spectral mirror to an impinging light beam. In a diffraction mode, the displacement controller applies a displacement voltage to the active elements. The active elements are now moved to a second plane parallel to the bias plane so that the light beam impinging on the light modulator will be diffracted. The illumination intensity of a detected light signal is proportional to the displacement voltage raised to a power of between approximately 1.75 and 3.0, the gamma response.

20 Claims, 10 Drawing Sheets

U.S. PATENT DOCUMENTS

| | | |
|---|---|---|
| 3,792,916 A | 2/1974 | Sarna |
| 3,802,769 A | 4/1974 | Rotz et al. |
| 3,811,186 A | 5/1974 | Larnerd et al. |
| 3,861,784 A | 1/1975 | Torok |
| 3,862,360 A | 1/1975 | Dill et al. |
| 3,871,014 A | 3/1975 | King et al. |
| 3,886,310 A | 5/1975 | Guldberg et al. |
| 3,896,338 A | 9/1975 | Nathanson et al. |
| 3,915,548 A | 10/1975 | Opittek |
| 3,935,499 A | 1/1976 | Oess |
| 3,935,500 A | 1/1976 | Oess et al. |
| 3,938,881 A | 2/1976 | Biegelsen et al. |
| 3,941,456 A | 3/1976 | Schilz et al. |
| 3,942,245 A | 3/1976 | Jackson et al. |
| 3,943,281 A | 3/1976 | Keller et al. |
| 3,947,105 A | 3/1976 | Smith |
| 3,969,611 A | 7/1976 | Fonteneau |
| 3,980,476 A | 9/1976 | Wysocki |
| 3,991,416 A | 11/1976 | Byles et al. .................. 345/87 |
| 4,001,663 A | 1/1977 | Bray |
| 4,004,849 A | 1/1977 | Shattuck |
| 4,006,968 A | 2/1977 | Ernstoff et al. |
| 4,009,939 A | 3/1977 | Okano |
| 4,011,009 A | 3/1977 | Lama et al. |
| 4,012,116 A | 3/1977 | Yevick |
| 4,012,835 A | 3/1977 | Wallick |
| 4,017,158 A | 4/1977 | Booth |
| 4,020,381 A | 4/1977 | Oess et al. |
| 4,021,766 A | 5/1977 | Aine |
| 4,034,211 A | 7/1977 | Horst et al. |
| 4,034,399 A | 7/1977 | Drukier et al. |
| 4,035,068 A | 7/1977 | Rawson |
| 4,067,129 A | 1/1978 | Abramson et al. |
| 4,084,437 A | 4/1978 | Finnegan |
| 4,090,219 A | 5/1978 | Ernstoff et al. |
| 4,093,346 A | 6/1978 | Nishino et al. |
| 4,093,921 A | 6/1978 | Buss |
| 4,093,922 A | 6/1978 | Buss |
| 4,100,579 A | 7/1978 | Ernstoff |
| 4,103,273 A | 7/1978 | Keller |
| 4,126,380 A | 11/1978 | Borm |
| 4,127,322 A | 11/1978 | Jacobson et al. |
| 4,135,502 A | 1/1979 | Peck |
| 4,139,257 A | 2/1979 | Matsumoto |
| 4,143,943 A | 3/1979 | Rawson |
| 4,163,570 A | 8/1979 | Greenaway |
| 4,184,700 A | 1/1980 | Greenaway |
| 4,185,891 A | 1/1980 | Kaestner |
| 4,190,855 A | 2/1980 | Inoue |
| 4,195,915 A | 4/1980 | Lichty et al. |
| 4,205,428 A | 6/1980 | Ernstoff et al. |
| 4,211,918 A | 7/1980 | Nyfeler et al. |
| 4,223,050 A | 9/1980 | Nyfeler et al. |
| 4,225,913 A | 9/1980 | Bray |
| 4,249,796 A | 2/1981 | Sincerbox et al. |
| 4,250,217 A | 2/1981 | Greenaway |
| 4,250,393 A | 2/1981 | Greenaway |
| 4,256,787 A | 3/1981 | Shaver et al. |
| 4,257,016 A | 3/1981 | Kramer, Jr. et al. |
| 4,290,672 A | 9/1981 | Whitefield |
| 4,295,145 A | 10/1981 | Latta |
| 4,311,999 A | 1/1982 | Upton et al. |
| 4,327,411 A | 4/1982 | Turner |
| 4,327,966 A | 5/1982 | Bloom ...................... 359/569 |
| 4,331,972 A | 5/1982 | Rajchman |
| 4,336,982 A | 6/1982 | Rector, Jr. |
| 4,338,660 A | 7/1982 | Kelley et al. |
| 4,343,535 A | 8/1982 | Bleha, Jr. |
| 4,346,965 A | 8/1982 | Spraque et al. |
| 4,348,079 A | 9/1982 | Johnson |
| 4,355,463 A | 10/1982 | Burns |
| 4,361,384 A | 11/1982 | Bosserman |
| 4,369,524 A | 1/1983 | Rawson et al. |
| 4,374,397 A | 2/1983 | Mir |
| 4,389,096 A | 6/1983 | Hori et al. |
| 4,391,490 A | 7/1983 | Hartke |
| 4,396,246 A | 8/1983 | Holman |
| 4,398,798 A | 8/1983 | Krawczak et al. |
| 4,400,740 A | 8/1983 | Traino et al. |
| 4,408,884 A | 10/1983 | Kleinknecht et al. |
| 4,414,583 A | 11/1983 | Hooker, III |
| 4,417,386 A | 11/1983 | Exner |
| 4,418,397 A | 11/1983 | Brantingham et al. |
| 4,420,717 A | 12/1983 | Wallace et al. |
| 4,422,099 A | 12/1983 | Wolfe |
| 4,426,768 A | 1/1984 | Black et al. |
| 4,430,584 A | 2/1984 | Someshwar et al. |
| 4,435,041 A | 3/1984 | Torok et al. |
| 4,440,839 A | 4/1984 | Mottier |
| 4,443,819 A | 4/1984 | Funada et al. |
| 4,443,845 A | 4/1984 | Hamilton et al. |
| 4,447,881 A | 5/1984 | Brantingham et al. |
| 4,454,591 A | 6/1984 | Lou |
| 4,456,338 A | 6/1984 | Gelbart |
| 4,460,907 A | 7/1984 | Nelson |
| 4,462,046 A | 7/1984 | Spight |
| 4,467,342 A | 8/1984 | Tower |
| 4,468,725 A | 8/1984 | Venturini |
| 4,483,596 A | 11/1984 | Marshall |
| 4,484,188 A | 11/1984 | Ott |
| 4,487,677 A | 12/1984 | Murphy |
| 4,492,435 A | 1/1985 | Banton et al. ............... 359/295 |
| 4,503,494 A | 3/1985 | Hamilton et al. |
| 4,511,220 A | 4/1985 | Scully |
| 4,538,883 A | 9/1985 | Sprague et al. |
| 4,545,610 A | 10/1985 | Lakritz et al. |
| 4,556,378 A | 12/1985 | Nyfeler et al. |
| 4,558,171 A | 12/1985 | Gantley et al. |
| 4,561,044 A | 12/1985 | Ogura et al. |
| 4,566,935 A | 1/1986 | Hornbeck ................... 438/29 |
| 4,567,585 A | 1/1986 | Gelbart |
| 4,571,041 A | 2/1986 | Gaudyn |
| 4,571,603 A | 2/1986 | Hornbeck et al. .......... 347/239 |
| 4,577,932 A | 3/1986 | Gelbart |
| 4,577,933 A | 3/1986 | Yip et al. |
| 4,588,957 A | 5/1986 | Balant et al. |
| 4,590,548 A | 5/1986 | Maytum |
| 4,594,501 A | 6/1986 | Culley et al. |
| 4,596,992 A | 6/1986 | Hornbeck ................... 374/134 |
| 4,615,595 A | 10/1986 | Hornbeck ................... 353/122 |
| 4,623,219 A | 11/1986 | Trias |
| 4,636,039 A | 1/1987 | Turner |
| 4,636,866 A | 1/1987 | Hattori |
| 4,641,193 A | 2/1987 | Glenn ........................ 348/771 |
| 4,645,881 A | 2/1987 | LeToumelin et al. |
| 4,646,158 A | 2/1987 | Ohno et al. |
| 4,649,085 A | 3/1987 | Landram |
| 4,649,432 A | 3/1987 | Watanabe et al. |
| 4,652,932 A | 3/1987 | Miyajima et al. |
| 4,655,539 A | 4/1987 | Caulfield et al. |
| 4,660,938 A | 4/1987 | Kazan |
| 4,661,828 A | 4/1987 | Miller, Jr. et al. |
| 4,662,746 A | 5/1987 | Hornbeck ................... 359/223 |
| 4,663,670 A | 5/1987 | Ito et al. |
| 4,687,326 A | 8/1987 | Corby, Jr. |
| 4,698,602 A | 10/1987 | Armitage ................... 359/294 |
| 4,700,276 A | 10/1987 | Freyman et al. |
| 4,707,064 A | 11/1987 | Dobrowolski et al. |
| 4,709,995 A | 12/1987 | Kuribayashi et al. |
| 4,710,732 A | 12/1987 | Hornbeck ................... 359/291 |
| 4,711,526 A | 12/1987 | Hennings et al. |

| | | | | | |
|---|---|---|---|---|---|
| 4,714,326 A | 12/1987 | Usui et al. | 5,035,473 A | 7/1991 | Kuwayama et al. |
| 4,717,066 A | 1/1988 | Goldenberg et al. | 5,037,173 A | 8/1991 | Sampsell et al. |
| 4,719,507 A | 1/1988 | Bos | 5,039,628 A | 8/1991 | Carey |
| 4,721,629 A | 1/1988 | Sakai et al. | 5,040,052 A | 8/1991 | McDavid |
| 4,722,593 A | 2/1988 | Shimazaki | 5,041,395 A | 8/1991 | Steffen |
| 4,724,467 A | 2/1988 | Yip et al. | 5,041,851 A | 8/1991 | Nelson ............... 347/134 |
| 4,728,185 A | 3/1988 | Thomas | 5,043,917 A | 8/1991 | Okamoto |
| 4,743,091 A | 5/1988 | Gelbart | 5,048,077 A | 9/1991 | Wells et al. |
| 4,744,633 A | 5/1988 | Sheiman | 5,049,901 A | 9/1991 | Gelbart |
| 4,747,671 A | 5/1988 | Takahashi et al. | 5,058,992 A | 10/1991 | Takahashi |
| 4,751,509 A | 6/1988 | Kubota et al. ............ 349/201 | 5,060,058 A | 10/1991 | Goldenberg et al. |
| 4,761,253 A | 8/1988 | Antes | 5,061,049 A | 10/1991 | Hornbeck ............ 359/224 |
| 4,763,975 A | 8/1988 | Scifres et al. | 5,066,614 A | 11/1991 | Dunnaway et al. |
| 4,765,865 A | 8/1988 | Gealer et al. | 5,068,205 A | 11/1991 | Baxter et al. |
| 4,772,094 A | 9/1988 | Sheiman | 5,072,239 A | 12/1991 | Mitcham et al. |
| 4,797,694 A | 1/1989 | Agostinelli et al. | 5,072,418 A | 12/1991 | Boutaud et al. |
| 4,797,918 A | 1/1989 | Lee et al. | 5,074,947 A | 12/1991 | Estes et al. |
| 4,801,194 A | 1/1989 | Agostinelli et al. | 5,075,940 A | 12/1991 | Kuriyama et al. |
| 4,803,560 A | 2/1989 | Matsunaga et al. | 5,079,544 A | 1/1992 | DeMond et al. ............ 345/84 |
| 4,804,641 A | 2/1989 | Arlt et al. | 5,083,857 A | 1/1992 | Hornbeck ............ 359/291 |
| 4,807,021 A | 2/1989 | Okumura | 5,096,279 A | 3/1992 | Hornbeck et al. ......... 359/230 |
| 4,807,965 A | 2/1989 | Garakani | 5,099,353 A | 3/1992 | Hornbeck ............ 359/291 |
| 4,809,078 A | 2/1989 | Yabe et al. | 5,142,405 A | 8/1992 | Hornbeck ............ 359/226 |
| 4,811,082 A | 3/1989 | Jacobs et al. | 5,148,157 A | 9/1992 | Florence ............ 345/84 |
| 4,811,210 A | 3/1989 | McAulay | 5,162,787 A | 11/1992 | Thompson et al. ......... 345/32 |
| 4,814,759 A | 3/1989 | Gombrich et al. | 5,164,019 A | 11/1992 | Sinton |
| 4,817,850 A | 4/1989 | Wiener-Avnear et al. | 5,165,013 A | 11/1992 | Faris |
| 4,824,200 A | 4/1989 | Isono et al. | 5,168,401 A | 12/1992 | Endriz |
| 4,827,391 A | 5/1989 | Sills | 5,168,406 A | 12/1992 | Nelson |
| 4,829,365 A | 5/1989 | Eichenlaub | 5,170,156 A | 12/1992 | DeMond et al. |
| 4,836,649 A | 6/1989 | Ledebuhr et al. | 5,170,269 A | 12/1992 | Lin et al. |
| 4,856,863 A | 8/1989 | Sampsell et al. | 5,170,283 A | 12/1992 | O'Brien et al. ............ 359/291 |
| 4,856,869 A | 8/1989 | Sakata et al. ............ 349/201 | 5,172,161 A | 12/1992 | Nelson |
| 4,859,012 A | 8/1989 | Cohn ............ 385/17 | 5,172,262 A | 12/1992 | Hornbeck ............ 359/223 |
| 4,859,060 A | 8/1989 | Katagiri et al. | 5,177,724 A | 1/1993 | Gelbart |
| 4,866,488 A | 9/1989 | Frensley | 5,178,728 A | 1/1993 | Boysel et al. |
| 4,882,683 A | 11/1989 | Rupp et al. | 5,179,274 A | 1/1993 | Sampsell |
| 4,893,509 A | 1/1990 | MacIver et al. | 5,179,367 A | 1/1993 | Shimizu |
| 4,896,325 A | 1/1990 | Coldren | 5,181,231 A | 1/1993 | Parikh et al. |
| 4,896,948 A | 1/1990 | Dono et al. | 5,182,665 A | 1/1993 | O'Callaghan et al. |
| 4,897,708 A | 1/1990 | Clements | 5,185,660 A | 2/1993 | Um ............ 348/755 |
| 4,902,083 A | 2/1990 | Wells | 5,188,280 A | 2/1993 | Nakao et al. |
| 4,915,463 A | 4/1990 | Barbee, Jr. ............ 359/360 | 5,189,404 A | 2/1993 | Masimo et al. |
| 4,915,479 A | 4/1990 | Clarke | 5,189,505 A | 2/1993 | Bartelink |
| 4,924,413 A | 5/1990 | Suwannukul | 5,191,405 A | 3/1993 | Tomita et al. |
| 4,926,241 A | 5/1990 | Carey | 5,192,864 A | 3/1993 | McEwen et al. |
| 4,930,043 A | 5/1990 | Wiegand | 5,192,946 A | 3/1993 | Thompson et al. ......... 348/764 |
| 4,934,773 A | 6/1990 | Becker | 5,198,895 A | 3/1993 | Vick |
| 4,940,309 A | 7/1990 | Baum | 5,202,785 A | 4/1993 | Nelson ............ 359/214 |
| 4,943,815 A | 7/1990 | Aldrich et al. | 5,206,629 A | 4/1993 | DeMond et al. |
| 4,945,773 A | 8/1990 | Sickafus | 5,208,818 A | 5/1993 | Gelbart et al. |
| 4,949,148 A | 8/1990 | Bartelink | 5,208,891 A | 5/1993 | Prysner |
| 4,950,890 A | 8/1990 | Gelbart | 5,210,637 A | 5/1993 | Puzey |
| 4,952,925 A | 8/1990 | Haastert | 5,212,115 A | 5/1993 | Cho et al. |
| 4,954,789 A | 9/1990 | Sampsell ............ 359/318 | 5,212,555 A | 5/1993 | Stoltz ............ 348/203 |
| 4,956,619 A | 9/1990 | Hornbeck ............ 359/317 | 5,212,582 A | 5/1993 | Nelson ............ 359/224 |
| 4,961,633 A | 10/1990 | Ibrahim et al. | 5,214,308 A | 5/1993 | Nishiguchi et al. |
| 4,970,575 A | 11/1990 | Soga et al. | 5,214,419 A | 5/1993 | DeMond et al. ............ 345/32 |
| 4,978,202 A | 12/1990 | Yang | 5,214,420 A | 5/1993 | Thompson et al. ............ 345/6 |
| 4,982,184 A | 1/1991 | Kirkwood ............ 345/84 | 5,216,537 A | 6/1993 | Hornbeck ............ 359/291 |
| 4,982,265 A | 1/1991 | Watanabe et al. | 5,216,544 A | 6/1993 | Horikawa et al. |
| 4,984,824 A | 1/1991 | Antes et al. | 5,219,794 A | 6/1993 | Satoh et al. |
| 4,999,308 A | 3/1991 | Nishiura et al. | 5,220,200 A | 6/1993 | Blanton |
| 5,003,300 A | 3/1991 | Wells | 5,221,400 A | 6/1993 | Staller et al. |
| 5,009,473 A | 4/1991 | Hunter et al. | 5,221,982 A | 6/1993 | Faris ............ 359/93 |
| 5,013,141 A | 5/1991 | Sakata | 5,224,088 A | 6/1993 | Atiya |
| 5,018,256 A | 5/1991 | Hornbeck | 5,226,099 A | 7/1993 | Mignardi et al. |
| 5,022,750 A | 6/1991 | Flasck | 5,230,005 A | 7/1993 | Rubino et al. |
| 5,023,905 A | 6/1991 | Wells et al. | 5,231,363 A | 7/1993 | Sano et al. |
| 5,024,494 A | 6/1991 | Williams et al. | 5,231,388 A | 7/1993 | Stoltz ............ 340/783 |
| 5,028,939 A | 7/1991 | Hornbeck et al. ............ 348/131 | 5,231,432 A | 7/1993 | Glenn ............ 353/31 |

| | | |
|---|---|---|
| 5,233,456 A | 8/1993 | Nelson ................. 359/214 |
| 5,233,460 A | 8/1993 | Partlo et al. |
| 5,233,874 A | 8/1993 | Putty et al. |
| 5,237,340 A | 8/1993 | Nelson |
| 5,237,435 A | 8/1993 | Kurematsu et al. ........ 359/41 |
| 5,239,448 A | 8/1993 | Perkins et al. |
| 5,239,806 A | 8/1993 | Maslakow |
| 5,240,818 A | 8/1993 | Mignardi et al. .......... 430/321 |
| 5,245,686 A | 9/1993 | Faris et al. |
| 5,247,180 A | 9/1993 | Mitcham et al. |
| 5,247,593 A | 9/1993 | Lin et al. ................. 385/17 |
| 5,249,245 A | 9/1993 | Lebby et al. |
| 5,251,057 A | 10/1993 | Guerin et al. |
| 5,251,058 A | 10/1993 | MacArthur |
| 5,254,980 A | 10/1993 | Hendrix et al. ............ 345/84 |
| 5,255,100 A | 10/1993 | Urbanus ................. 348/441 |
| 5,256,869 A | 10/1993 | Lin et al. ............... 250/201.9 |
| 5,258,325 A | 11/1993 | Spitzer et al. |
| 5,260,718 A | 11/1993 | Rommelmann et al. |
| 5,260,798 A | 11/1993 | Um et al. |
| 5,262,000 A | 11/1993 | Welbourn et al. |
| 5,272,473 A | 12/1993 | Thompson et al. ............ 345/7 |
| 5,278,652 A | 1/1994 | Urbanus et al. ............ 358/160 |
| 5,278,925 A | 1/1994 | Boysel et al. ................ 385/14 |
| 5,280,277 A | 1/1994 | Hornbeck ................. 345/108 |
| 5,281,887 A | 1/1994 | Engle |
| 5,281,957 A | 1/1994 | Schoolman |
| 5,285,105 A | 2/1994 | Cain |
| 5,285,196 A | 2/1994 | Gale, Jr. ................. 345/108 |
| 5,285,407 A | 2/1994 | Gale et al. ............ 365/189.11 |
| 5,287,096 A | 2/1994 | Thompson et al. ......... 345/147 |
| 5,287,215 A | 2/1994 | Warde et al. .............. 359/293 |
| 5,289,172 A | 2/1994 | Gale, Jr. et al. ........... 345/108 |
| 5,291,317 A | 3/1994 | Newswanger |
| 5,291,473 A | 3/1994 | Pauli ........................ 369/112 |
| 5,293,511 A | 3/1994 | Poradish et al. |
| 5,296,408 A | 3/1994 | Wilbarg et al. |
| 5,296,891 A | 3/1994 | Vogt et al. |
| 5,296,950 A | 3/1994 | Lin et al. ..................... 359/9 |
| 5,298,460 A | 3/1994 | Nishiguchi et al. |
| 5,299,037 A | 3/1994 | Sakata ........................ 359/41 |
| 5,299,289 A | 3/1994 | Omae et al. |
| 5,300,813 A | 4/1994 | Joshi et al. |
| 5,301,062 A | 4/1994 | Takahashi et al. |
| 5,303,043 A | 4/1994 | Glenn |
| 5,303,055 A | 4/1994 | Hendrix et al. ............ 348/761 |
| 5,307,056 A | 4/1994 | Urbanus |
| 5,307,185 A | 4/1994 | Jones et al. |
| 5,310,624 A | 5/1994 | Ehrlich |
| 5,311,349 A | 5/1994 | Anderson et al. |
| 5,311,360 A | 5/1994 | Bloom et al. ................ 359/572 |
| 5,312,513 A | 5/1994 | Florence et al. |
| 5,313,479 A | 5/1994 | Florence |
| 5,313,648 A | 5/1994 | Ehlig et al. |
| 5,313,835 A | 5/1994 | Dunn |
| 5,315,418 A | 5/1994 | Sprague et al. |
| 5,315,423 A | 5/1994 | Hong |
| 5,319,214 A | 6/1994 | Gregory et al. ......... 250/504 R |
| 5,319,789 A | 6/1994 | Ehlig et al. |
| 5,319,792 A | 6/1994 | Ehlig et al. |
| 5,321,416 A | 6/1994 | Bassett et al. |
| 5,323,002 A | 6/1994 | Sampsell et al. |
| 5,323,051 A | 6/1994 | Adams et al. |
| 5,325,116 A | 6/1994 | Sampsell |
| 5,327,286 A | 7/1994 | Sampsell et al. |
| 5,329,289 A | 7/1994 | Sakamoto et al. |
| 5,330,301 A | 7/1994 | Brancher |
| 5,330,878 A | 7/1994 | Nelson |
| 5,331,454 A | 7/1994 | Hornbeck ................. 359/224 |
| 5,334,991 A | 8/1994 | Wells et al. |
| 5,339,116 A | 8/1994 | Urbanus et al. ............ 348/716 |
| 5,339,177 A | 8/1994 | Jenkins et al. |
| 5,340,772 A | 8/1994 | Rosotker |
| 5,345,521 A | 9/1994 | McDonald et al. ........... 385/19 |
| 5,347,321 A | 9/1994 | Gove |
| 5,347,378 A | 9/1994 | Handschy et al. |
| 5,347,433 A | 9/1994 | Sedlmayr |
| 5,348,619 A | 9/1994 | Bohannon et al. |
| 5,349,687 A | 9/1994 | Ehlig et al. |
| 5,351,052 A | 9/1994 | D'Hont et al. |
| 5,352,926 A | 10/1994 | Andrews |
| 5,354,416 A | 10/1994 | Okudaira et al. |
| 5,357,369 A | 10/1994 | Pilling et al. |
| 5,357,803 A | 10/1994 | Lane |
| 5,359,349 A | 10/1994 | Jambor et al. |
| 5,359,451 A | 10/1994 | Gelbart et al. |
| 5,361,131 A | 11/1994 | Tekemori et al. |
| 5,363,220 A | 11/1994 | Kuwayama et al. ............ 359/3 |
| 5,365,283 A | 11/1994 | Doherty et al. |
| 5,367,585 A | 11/1994 | Ghezzo et al. |
| 5,371,543 A | 12/1994 | Anderson |
| 5,371,618 A | 12/1994 | Tai et al. |
| 5,382,961 A | 1/1995 | Gate, Jr. .................... 345/108 |
| 5,387,924 A | 2/1995 | Gale, Jr. et al. |
| 5,389,182 A | 2/1995 | Mignardi ................... 156/344 |
| 5,391,881 A | 2/1995 | Jeuch et al. |
| 5,392,140 A | 2/1995 | Ezra et al. |
| 5,392,151 A | 2/1995 | Nelson ..................... 359/223 |
| 5,394,303 A | 2/1995 | Yamaji |
| 5,398,071 A | 3/1995 | Gove et al. |
| 5,399,898 A | 3/1995 | Rostoker |
| 5,404,365 A | 4/1995 | Hiiro |
| 5,404,485 A | 4/1995 | Ban |
| 5,411,769 A | 5/1995 | Hornbeck .................. 427/534 |
| 5,442,414 A | 8/1995 | Janssen et al. .............. 353/98 |
| 5,444,566 A | 8/1995 | Gale et al. ................. 359/291 |
| 5,446,479 A | 8/1995 | Thompson et al. ......... 345/139 |
| 5,447,600 A | 9/1995 | Webb ......................... 216/2 |
| 5,452,024 A | 9/1995 | Sampsell .................... 348/755 |
| 5,453,778 A | 9/1995 | Venkateswar et al. ....... 347/239 |
| 5,454,906 A | 10/1995 | Baker et al. ................ 216/66 |
| 5,459,610 A | 10/1995 | Bloom et al. .............. 359/572 |
| 5,467,106 A | 11/1995 | Salomon |
| 5,467,138 A | 11/1995 | Gove |
| 5,467,146 A | 11/1995 | Huang et al. ............... 348/743 |
| 5,469,302 A | 11/1995 | Lim ........................ 359/846 |
| 5,471,341 A | 11/1995 | Warde et al. |
| 5,473,512 A | 12/1995 | Degani et al. |
| 5,475,236 A | 12/1995 | Yoshizaki |
| 5,480,839 A | 1/1996 | Ezawa et al. |
| 5,481,118 A | 1/1996 | Tew |
| 5,481,133 A | 1/1996 | Hsu |
| 5,482,564 A | 1/1996 | Douglas et al. |
| 5,482,818 A | 1/1996 | Nelson |
| 5,483,307 A | 1/1996 | Anderson |
| 5,485,172 A | 1/1996 | Sawachika et al. |
| 5,485,304 A | 1/1996 | Kaeriyama ................ 359/291 |
| 5,485,354 A | 1/1996 | Ciupke et al. |
| 5,486,698 A | 1/1996 | Hanson et al. ............. 250/332 |
| 5,486,841 A | 1/1996 | Hara et al. |
| 5,486,946 A | 1/1996 | Jachimowicz et al. |
| 5,488,431 A | 1/1996 | Gove et al. |
| 5,489,952 A | 2/1996 | Gove et al. |
| 5,490,009 A | 2/1996 | Venkateswar et al. |
| 5,491,510 A | 2/1996 | Gove |
| 5,491,612 A | 2/1996 | Nicewarner, Jr. |
| 5,491,715 A | 2/1996 | Flaxl |
| 5,493,177 A | 2/1996 | Muller et al. |
| 5,493,439 A | 2/1996 | Engle ....................... 359/292 |
| 5,497,172 A | 3/1996 | Doherty et al. |
| 5,497,197 A | 3/1996 | Gove et al. |
| 5,497,262 A | 3/1996 | Kaeriyama ................ 359/223 |

| | | | | | | |
|---|---|---|---|---|---|---|
| 5,499,060 A | 3/1996 | Gove et al. | | 5,744,752 A | 4/1998 | McHerron et al. |
| 5,499,062 A | 3/1996 | Urbanus | | 5,745,271 A | 4/1998 | Ford et al. |
| 5,500,761 A | 3/1996 | Goossen et al. ............ 359/290 | | 5,757,354 A | 5/1998 | Kawamura |
| 5,502,481 A | 3/1996 | Dentinger et al. | | 5,757,536 A | 5/1998 | Ricco et al. ................. 359/224 |
| 5,504,504 A | 4/1996 | Markandey et al. | | 5,764,280 A | 6/1998 | Bloom et al. |
| 5,504,514 A | 4/1996 | Nelson | | 5,768,009 A | 6/1998 | Little |
| 5,504,575 A | 4/1996 | Stafford | | 5,773,473 A | 6/1998 | Hall et al. |
| 5,504,614 A | 4/1996 | Webb et al. ................. 359/223 | | 5,793,519 A | 8/1998 | Furlani et al. |
| 5,506,171 A | 4/1996 | Leonard et al. | | 5,798,743 A | 8/1998 | Bloom |
| 5,506,597 A | 4/1996 | Thompson et al. | | 5,798,805 A | 8/1998 | Ooi et al. |
| 5,506,720 A | 4/1996 | Yoon | | 5,801,074 A | 9/1998 | Kim et al. |
| 5,508,558 A | 4/1996 | Robinette, Jr. et al. | | 5,802,222 A | 9/1998 | Rasch et al. |
| 5,508,561 A | 4/1996 | Tago et al. | | 5,808,323 A | 9/1998 | Spaeth et al. |
| 5,508,565 A | 4/1996 | Hatakeyama et al. | | 5,808,797 A | 9/1998 | Bloom et al. ................ 359/572 |
| 5,508,750 A | 4/1996 | Hewlett et al. | | 5,815,126 A | 9/1998 | Fan et al. |
| 5,508,840 A | 4/1996 | Vogel et al. | | 5,825,443 A | 10/1998 | Kawasaki et al. |
| 5,508,841 A | 4/1996 | Lin et al. | | 5,835,255 A | 11/1998 | Miles |
| 5,510,758 A | 4/1996 | Fujita et al. | | 5,835,256 A | 11/1998 | Mammone |
| 5,510,824 A | 4/1996 | Nelson ........................ 347/239 | | 5,837,562 A | 11/1998 | Cho |
| 5,512,374 A | 4/1996 | Wallace et al. ............. 428/422 | | 5,841,579 A | 11/1998 | Bloom et al. ................ 359/572 |
| 5,512,748 A | 4/1996 | Hanson | | 5,844,711 A | 12/1998 | Long, Jr. |
| 5,515,076 A | 5/1996 | Thompson et al. | | 5,847,859 A | 12/1998 | Murata |
| 5,516,125 A | 5/1996 | McKenna | | 5,862,164 A | 1/1999 | Hill |
| 5,517,340 A | 5/1996 | Doany et al. | | 5,868,854 A | 2/1999 | Kojima et al. |
| 5,517,347 A | 5/1996 | Sampsell | | 5,886,675 A | 3/1999 | Aye et al. |
| 5,517,357 A | 5/1996 | Shibayama | | 5,892,505 A | 4/1999 | Tropper |
| 5,517,359 A | 5/1996 | Gelbart | | 5,895,233 A | 4/1999 | Higashi et al. |
| 5,519,251 A | 5/1996 | Sato et al. | | 5,898,515 A | 4/1999 | Furlani et al. |
| 5,519,450 A | 5/1996 | Urbanus et al. | | 5,903,243 A | 5/1999 | Jones |
| 5,521,748 A | 5/1996 | Sarraf | | 5,903,395 A | 5/1999 | Rallison et al. |
| 5,523,619 A | 6/1996 | McAllister et al. | | 5,910,856 A | 6/1999 | Ghosh et al. |
| 5,523,628 A | 6/1996 | Williams et al. | | 5,912,094 A | 6/1999 | Aksyuk et al. |
| 5,523,803 A | 6/1996 | Urbanus et al. | | 5,912,608 A | 6/1999 | Asada |
| 5,523,878 A | 6/1996 | Wallace et al. | | 5,914,801 A | 6/1999 | Dhuler et al. |
| 5,523,881 A | 6/1996 | Florence et al. | | 5,915,168 A | 6/1999 | Salatino et al. |
| 5,523,920 A | 6/1996 | Machuga et al. | | 5,919,548 A | 7/1999 | Barron et al. |
| 5,524,155 A | 6/1996 | Weaver | | 5,920,411 A | 7/1999 | Duck et al. |
| 5,534,107 A | 7/1996 | Gray et al. | | 5,920,418 A | 7/1999 | Shiono et al. |
| 5,534,883 A | 7/1996 | Koh | | 5,923,475 A | 7/1999 | Kurtz et al. |
| 5,539,422 A | 7/1996 | Heacock et al. | | 5,926,309 A | 7/1999 | Little ......................... 359/293 |
| 5,544,306 A | 8/1996 | Deering et al. | | 5,926,318 A | 7/1999 | Hebert |
| 5,554,304 A | 9/1996 | Suzuki | | 5,942,791 A | 8/1999 | Shorrocks et al. |
| 5,576,878 A | 11/1996 | Henck | | 5,949,390 A | 9/1999 | Nomura et al. |
| 5,602,671 A | 2/1997 | Hornbeck | | 5,949,570 A | 9/1999 | Shiono et al. ............. 359/291 |
| 5,606,181 A | 2/1997 | Sakuma et al. | | 5,953,161 A | 9/1999 | Troxell et al. |
| 5,606,447 A | 2/1997 | Asada et al. | | 5,955,771 A | 9/1999 | Kurtz et al. |
| 5,610,438 A | 3/1997 | Wallace et al. | | 5,978,127 A | 11/1999 | Berg .......................... 359/279 |
| 5,623,361 A | 4/1997 | Engle ........................ 359/291 | | 5,982,553 A | 11/1999 | Bloom et al. ................ 359/627 |
| 5,629,566 A | 5/1997 | Doi et al. | | 5,986,634 A | 11/1999 | Alioshin et al. |
| 5,629,801 A | 5/1997 | Staker et al. | | 5,986,796 A | 11/1999 | Miles |
| 5,640,216 A | 6/1997 | Hasegawa et al. | | 5,995,303 A | 11/1999 | Honguh et al. |
| 5,658,698 A | 8/1997 | Yagi et al. | | 5,999,319 A | 12/1999 | Castracane ................... 359/573 |
| 5,661,592 A | 8/1997 | Bornstein et al. ........... 359/291 | | 6,004,912 A | 12/1999 | Gudeman |
| 5,661,593 A | 8/1997 | Engle | | 6,016,222 A | 1/2000 | Setani et al. |
| 5,663,817 A | 9/1997 | Frapin et al. | | 6,025,859 A | 2/2000 | Ide et al. ..................... 347/135 |
| 5,668,611 A | 9/1997 | Ernstoff et al. | | 6,038,057 A | 3/2000 | Brazas, Jr. et al. |
| 5,673,139 A | 9/1997 | Johnson | | 6,040,748 A | 3/2000 | Gueissaz |
| 5,677,783 A | 10/1997 | Bloom et al. | | 6,046,840 A | 4/2000 | Huibers ...................... 359/291 |
| 5,689,361 A | 11/1997 | Damen et al. | | 6,055,090 A | 4/2000 | Miles |
| 5,691,836 A | 11/1997 | Clark | | 6,057,520 A | 5/2000 | Goodwin-Johansson |
| 5,694,740 A | 12/1997 | Martin et al. | | 6,061,166 A | 5/2000 | Furlani et al. ............... 359/254 |
| 5,696,560 A | 12/1997 | Songer | | 6,061,489 A | 5/2000 | Ezra |
| 5,699,740 A | 12/1997 | Gelbart | | 6,062,461 A | 5/2000 | Sparks et al. |
| 5,704,700 A | 1/1998 | Kappel et al. | | 6,064,404 A | 5/2000 | Aras et al. |
| 5,707,160 A | 1/1998 | Bowen | | 6,069,392 A | 5/2000 | Tai et al. |
| 5,712,649 A | 1/1998 | Tosaki | | 6,071,652 A | 6/2000 | Feldman et al. ................ 430/5 |
| 5,713,652 A | 2/1998 | Zavracky et al. | | 6,075,632 A | 6/2000 | Braun |
| 5,726,480 A | 3/1998 | Pister | | 6,084,626 A | 7/2000 | Ramanujan et al. |
| 5,731,802 A | 3/1998 | Aras et al. | | 6,088,102 A | 7/2000 | Manhart |
| 5,734,224 A | 3/1998 | Tagawa et al. | | 6,090,717 A | 7/2000 | Powell et al. |
| 5,742,373 A | 4/1998 | Alvelda | | 6,091,521 A | 7/2000 | Popovich |

| | | |
|---|---|---|
| 6,096,576 A | 8/2000 | Corbin et al. |
| 6,097,352 A | 8/2000 | Zavracky et al. |
| 6,101,036 A | 8/2000 | Bloom |
| 6,115,168 A | 9/2000 | Zhao et al. ............... 359/247 |
| 6,122,299 A | 9/2000 | DeMars et al. |
| 6,123,985 A | 9/2000 | Robinson et al. |
| 6,124,145 A | 9/2000 | Stemme et al. |
| 6,130,770 A | 10/2000 | Bloom |
| 6,144,481 A | 11/2000 | Kowarz et al. |
| 6,147,789 A | 11/2000 | Gelbart |
| 6,154,259 A | 11/2000 | Hargis et al. |
| 6,163,026 A | 12/2000 | Bawolek et al. |
| 6,163,402 A | 12/2000 | Chou et al. |
| 6,169,624 B1 | 1/2001 | Godil et al. ............... 359/237 |
| 6,172,796 B1 | 1/2001 | Kowarz et al. ............ 359/290 |
| 6,172,797 B1 | 1/2001 | Huibers .................... 359/291 |
| 6,177,980 B1 | 1/2001 | Johnson |
| 6,181,458 B1 | 1/2001 | Brazas, Jr. et al. ........ 359/290 |
| 6,188,519 B1 | 2/2001 | Johnson .................... 359/572 |
| 6,195,196 B1 | 2/2001 | Kimura et al. |
| 6,197,610 B1 | 3/2001 | Toda |
| 6,210,988 B1 | 4/2001 | Howe et al. |
| 6,215,579 B1 | 4/2001 | Bloom et al. ............... 359/298 |
| 6,219,015 B1 | 4/2001 | Bloom et al. ................. 345/87 |
| 6,222,954 B1 | 4/2001 | Riza |
| 6,229,650 B1 | 5/2001 | Reznichenko et al. |
| 6,229,683 B1 | 5/2001 | Goodwin-Johansson |
| 6,241,143 B1 | 6/2001 | Kuroda |
| 6,251,842 B1 | 6/2001 | Gudeman |
| 6,252,697 B1 | 6/2001 | Hawkins et al. ........... 359/290 |
| 6,254,792 B1 | 7/2001 | Van Buskirk et al. |
| 6,261,494 B1 | 7/2001 | Zavracky et al. |
| 6,268,952 B1 | 7/2001 | Godil et al. ............... 359/291 |
| 6,271,145 B1 | 8/2001 | Toda |
| 6,271,808 B1 | 8/2001 | Corbin |
| 6,274,469 B1 | 8/2001 | Yu |
| 6,290,859 B1 | 9/2001 | Fleming et al. |
| 6,290,864 B1 | 9/2001 | Patel et al. |
| 6,300,148 B1 | 10/2001 | Birdsley et al. |
| 6,303,986 B1 | 10/2001 | Shook |
| 6,310,018 B1 | 10/2001 | Behr et al. |
| 6,323,984 B1 | 11/2001 | Trisnadi |
| 6,327,071 B1 | 12/2001 | Kimura |
| 6,342,690 B1 | 1/2002 | McCullough |
| 6,356,577 B1 | 3/2002 | Miller |
| 6,359,333 B1 | 3/2002 | Wood et al. |
| 6,384,959 B1 | 5/2002 | Furlani et al. |
| 6,387,723 B1 | 5/2002 | Payne et al. |
| 6,392,309 B1 | 5/2002 | Wataya et al. |
| 6,396,789 B1 | 5/2002 | Guerra et al. ............... 369/112 |
| 6,445,502 B1 | 9/2002 | Islam et al. ................. 359/571 |
| 6,452,260 B1 | 9/2002 | Corbin et al. |
| 6,466,354 B1 | 10/2002 | Gudeman |
| 6,480,634 B1 | 11/2002 | Corrigan |
| 6,497,490 B1 | 12/2002 | Miller et al. |
| 6,525,863 B1 | 2/2003 | Riza |
| 6,563,974 B2 | 5/2003 | Riza |
| 2002/0015230 A1 | 2/2002 | Pilossof et al. ............ 359/558 |
| 2002/0021485 A1 | 2/2002 | Pilossof ..................... 359/295 |
| 2002/0079432 A1 | 6/2002 | Lee et al. ................... 250/216 |
| 2002/0105725 A1 | 8/2002 | Sweatt et al. ............... 359/566 |

FOREIGN PATENT DOCUMENTS

| | | | | |
|---|---|---|---|---|
| EP | | 0 689 078 A1 | 12/1995 | ........... G03B/26/08 |
| EP | | 0 801 319 A1 | 10/1997 | ........... G02B/26/00 |
| JP | | 63-305323 | 12/1988 | ............. G02F/1/13 |
| WO | | WO 92/12506 | 7/1992 | ............. G09F/9/37 |
| WO | | WO 93/09472 | 5/1993 | ............. G03F/7/20 |
| WO | | WO 94/09473 | 4/1994 | ............ G09G/3/34 |
| WO | | WO 96/08031 | 3/1996 | ............ H01J/29/12 |
| WO | | WO 96/41217 | 12/1996 | ............ G02B/5/18 |
| WO | | WO 96/41224 | 12/1996 | ............ G02B/19/00 |
| WO | | WO 97/26569 | 7/1997 | ............ G02B/5/18 |

OTHER PUBLICATIONS

O. Solgaard, Integrated Semiconductor Light Modulators for Fiber–Optic and Display Applications, Ph.D. Dissertation, Stanford University Feb., 1992.

J. Neff, "Two–Dimensional Spatial Lght Modulators: A Tutorial", Proceedings of the IEEE, vol. 78, No. 5 (May 1990), pp. 826–855.

Gerhard–Multhaupt, "Viscoelastic Spatial Light Modulators and Schlieren–Optical Systems for HDTV Projection Displays" SPIE vol. 1255 Large Screen Projection Displays 11 (1990), pp. 69–78.

Gerhard–Multhaupt, "Light–Valve Technologies for High–Definition Television Projection Displays", Displays vol. 12, No. 3/4 (1991), pp. 115–128.

O. Solgaard, F. Sandejas, and D. Bloom, "Deformable Grating Optical Modulator," Optics Letters, vol. 17, No. 9, May 1, 1992, New York, USA, pp. 688–690.

Phillip Alvelda, "VLSI Microdisplays and Optoelectric Technology," MIT, pp. 1–93, 1995.

Philip Alvelda, "VLSI Microdisplay Technology," Oct. 14, 1994.

Hornbeck, L.J., "Deformable–Mirror Spatial Light Modulators," Spatial Light Modulators and Applications III, Aug. 8, 1989, pp. 86–102.

Gani et al., "Variable Gratings for Optical Switching: Rigorous Electromagnetic Simulation and Design," Optical Engineering, vol. 38, No. 3, pp 552–557, Mar. 1999.

T. Iwai et al., "Real–time Profiling of a Pure Phase Object Using an Auto–Wigner Distribution Function," Optics Communications, vol. 95, nos. 4–6, Jan. 15, 1993, pp 199–204.

R. Tepe, R. Gerhard–Multhaupt, W. Brinker and W, D. Molzow, "Viscoelastic Spatial Light Modulator with Active Matrix Addressing," Applied Optics, vol. 28, No. 22, New York, USA, pp. 4826–4834, Nov. 15, 1989.

W. Brinker, R. Gerhard–Multhaupt, W, D. Molzow and R. Tepe,, "Deformation Behavior of Thin Viscoelastic Layers Used in an Active–Matrix–Addressed Spatial Light Modulator," SPIE vol. 1018, pp. 79–85, Germany, 1988.

T. Utsunomiya and H. Sato, "Electrically Deformable Echellete Grating and its Application to Tunable Laser Resonator," Electronics and Communications in Japan, vol. 63–c, No. 10, pp. 94–100, Japan, 1980.

R.N. Thomas, et al., "The Mirror–Matrix Tube: A Novel Light Valve for Projection Displays", IEEE Transactions on Electron Devices, vol. ED–22, No. 9, pp. 765–775, Sep. 1975.

"Image Orientation Sensing and Correction for Notepads", Research Disclosure, No. 34788, p. 217, Mar. 1993.

"Micromachined Opto/Electro/Mechanical Systems," Electronic Systems, NASA Tech Briefs, Mar. 1997, pp. 50 & 52.

David M. Burns et al., "Development of Microelectromechanical Variable Blaze Gratings," Sensors and Actuators A 64 (1998), pp. 7–15.

Apte et al., "Deformable Grating Light Valves for High Resolution Displays," Solid State Actuator Workshop, Hilton Head, South Carolina, Jun. 13–16, 1994.

Sene et al., "Polysilicon micromechanical gratings for optical modulation," Sensors and Actuators, vol. A57, pp. 145–151, 1996.

Amm et al., "*Invited Paper:* Grating Light Valve™ Technology: Update and Novel Applications," SID Digest, vol. 29, 1998.

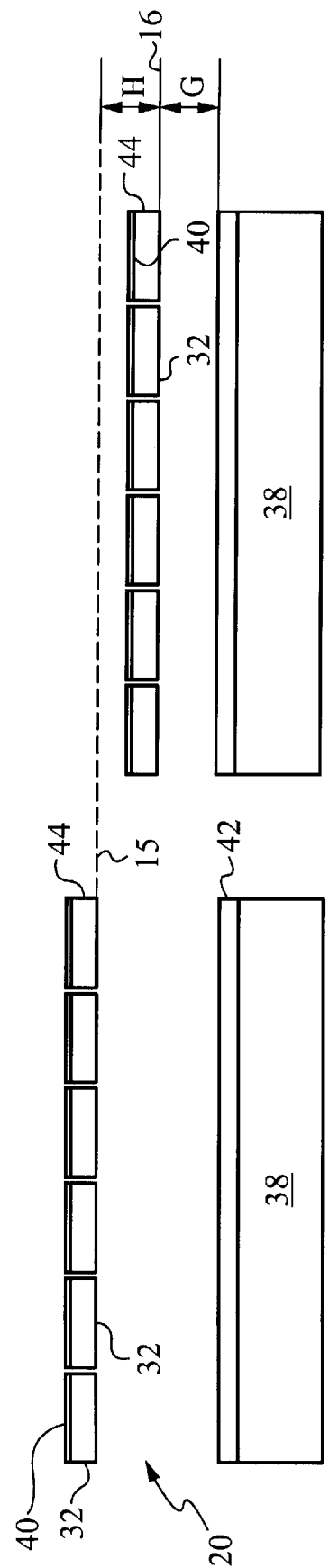

METHOD AND DEVICE FOR MODULATING A LIGHT BEAM AND HAVING AN IMPROVED GAMMA RESPONSE

FIELD OF THE INVENTION

This invention relates to a method and device for modulating a light beam. More specifically, this invention relates to a light modulator that is electro-mechanically biased in order to more efficiently modulate optical signals by having an improved gamma response.

BACKGROUND OF THE INVENTION

For light modulating devices, the relationship between an applied signal (usually a voltage) and the resulting output illumination intensity is referred to as the response function or transfer function. For many devices, this response function approximates the function form of $I=kV^\gamma$, where I is the output illumination intensity, V is the applied voltage, k is an arbitrary constant that is selected for the device under consideration, and $\gamma$ (gamma), which determines the response of the modulator, is the exponent. Thus, light modulators can be described simply by their "gamma" response. A gamma value of 1 describes a light modulator for which the intensity varies linearly with the applied signal. When such a device is used in an image display device, it is difficult to render images without observable granularity or visible "steps" in the darkest portions of an image. Thus, a higher gamma value is desirable for displays. Also, the best image reproduction can be obtained by matching the display device gamma to the manner in which the image was originally recorded, referred to as the source or content gamma. Conventional image source gamma values are in the range of 2 to 3.

What is needed is a light modulator that has a tunable gamma response that can be optimized for a variety of applications.

SUMMARY OF THE INVENTION

Embodiments of the present invention include an apparatus having an improved, tunable gamma response. The apparatus comprises a light modulator having a plurality of spaced-apart elements, having alternating active elements and passive elements lying in a first plane; a gamma controller; and a displacement controller. The gamma controller applies a gamma voltage to a substrate, creating an electrostatic field that pulls the spaced-apart elements to a bias plane parallel to the first plane and preferably closer to the substrate. In a reflection mode, the plurality of spaced-apart elements all lie in the bias plane, and a light beam impinging on the plurality of spaced-apart elements will be substantially reflected so that the plurality of spaced-apart elements act as a specular mirror. A low-noise optical receiver that accepts only diffracted light (a first-order receiver) will detect a signal having a substantially zero illumination intensity. In a diffraction mode, the displacement controller applies a displacement voltage to the active elements. In response to the displacement controller, the active elements are moved to a second plane substantially parallel to the bias plane and preferably closer to the substrate so that a light beam impinging on the light modulator will be substantially diffracted. A first-order receiver will now detect a signal having a non-zero illumination intensity. The illumination intensity of the detected signal is proportional to the displacement voltage raised to an exponential power known as the gamma response. Preferably, the gamma response is between approximately 1.75 and 3.0.

BRIEF DESCRIPTION OF THE DRAWINGS

FIG. 2 illustrates a cross-section of the light modulator of FIG. 1 with the elongated elements in a first plane.

FIG. 3 illustrates a cross-section of the light modulator of FIG. 1 with a gamma voltage applied to the substrate so that the elongated elements are displaced to a bias plane.

DETAILED DESCRIPTION OF THE EMBODIMENTS

Embodiments of the present invention include a light modulator that modulates light beams and has a tunable gamma response. In a light modulator, light impinges on a plurality of elongated spaced-apart elements. By applying an input signal such as a displacement voltage to the alternate spaced-apart (active) elements, the active elements are selectively deformed (bent) so that the impinging light is either substantially reflected or substantially diffracted. A low-noise optical receiver that accepts only first-order diffracted light (a first-order receiver), such as a Schlieren optical system, will thus detect light having a non-zero illumination intensity $I_1$ when the light beam is substantially diffracted, and will detect light having little or no illumination intensity $I_1$ when the light is substantially reflected. The exponent for the transfer relationship between the input signal and the illumination intensity $I_1$ is called the gamma response. Applying the present invention to a light modulator will provide a light modulator that has a tunable gamma response. Thus, the relationship between the displacement voltage and the illumination intensity can be optimally tuned to fit various needs.

The first-order receiver may be coupled with many devices that use modulated light or devices that modulate light to deliver information optically. The device may, for example, be used in high-definition image displays, which use modulated light beams to illuminate individual pixels on projection displays and computer-to-plate products; optical switches, which use modulated light beams to route optical data to destination ports on routers or to redundant equipment during system failures; dynamic gain equalizers, which use modulated light beams to correct imbalances in the power of optical signals transmitted over optical fibers; and dynamically tunable filters, which use modulated light beams to filter out signals within a variable range of wavelengths.

Figure 1:
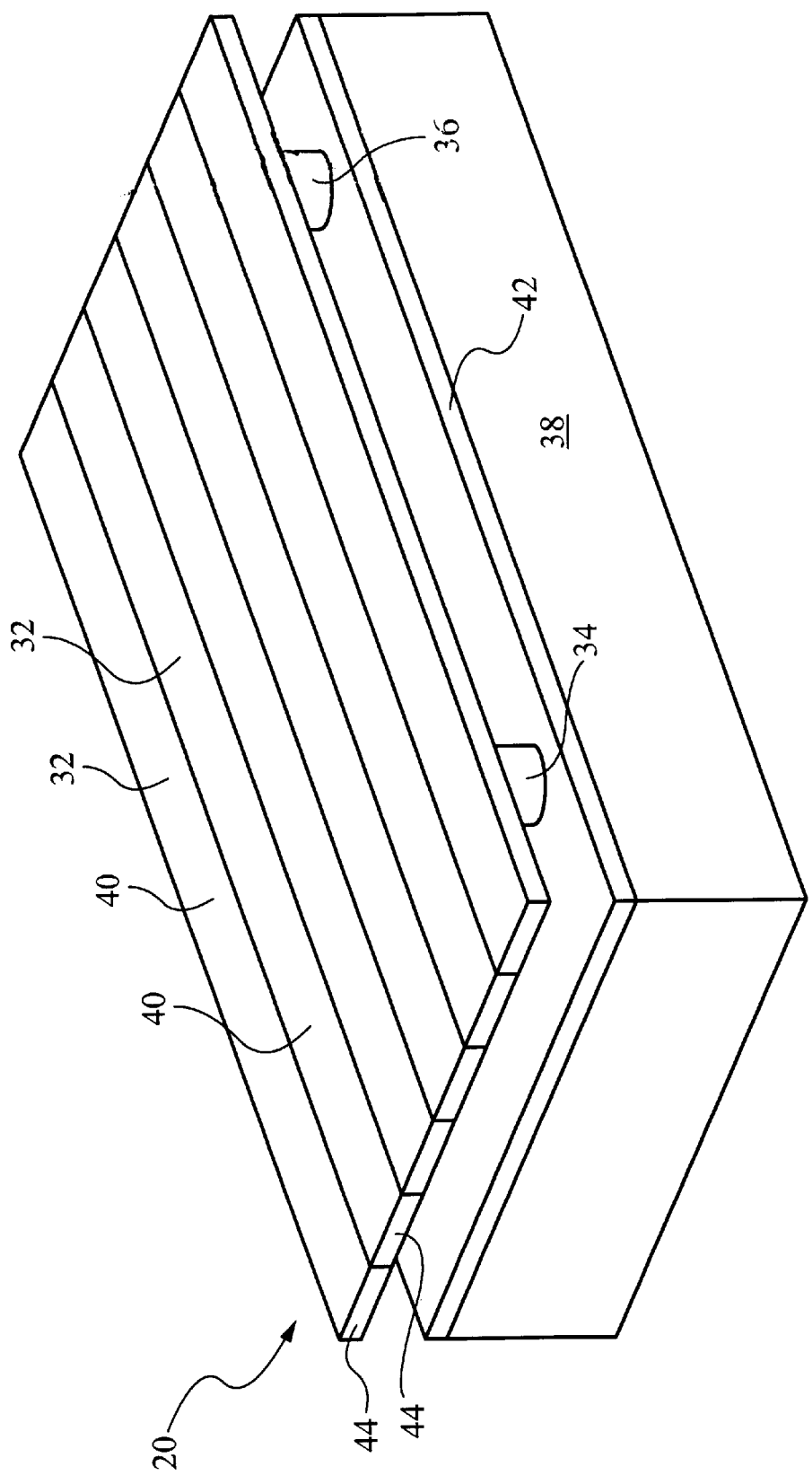
FIG. 1 schematically illustrates a representative light modulator.

The light modulator 20 according to an embodiment of the present invention is schematically illustrated in FIG. 1. The light modulator 20 preferably comprises elongated elements 32 suspended by first and second posts, 34 and 36, above a substrate 38. The elongated elements 32 each comprise a conducting and reflecting surface 40. The substrate 38 comprises a conductor 42. In operation, the light modulator 20 operates to produce modulated light selected from a reflection mode and a diffraction mode.

The light modulator 20 comprises the elongated elements 32. The elongated elements 32 are formed parallel to one another to lie substantially in a first plane. The elongated elements 32 each comprise a conducting and reflecting surface 40 and a resilient material 44. The substrate 38 comprises the conductor 42.

In operation, an electrical gamma voltage is applied to the conductor 42 of the substrate 38. As described below, before the gamma voltage is applied, the elongated elements 32 lie substantially in the first plane. The gamma voltage generates an electrostatic field that bends the elongated elements 32, displacing them toward the substrate 38. When the gamma voltage is applied, the elongated elements 32 are displaced slightly, substantially to a bias plane parallel to the first plane and to a gap length G (FIG. 3) above the substrate 38. As described in more detail below, this displacement provides an improved gamma response for the light modulator 20.

FIG. 2 shows a cross-section of the light modulator 20 of FIG. 1, with no gamma voltage applied to the substrate 38 (i.e., to the conductor 42 of the substrate 38). FIG. 2 shows that the elongated elements 32 lie substantially in a first plane 15.

FIG. 3 shows the light modulator 20 of FIG. 2 with a gamma voltage applied to the substrate 38 and a zero voltage applied to the elongated elements 32. FIG. 3 shows that the elongated elements 32 have been displaced a distance H closer to the substrate 38, to a second (bias) plane 16, substantially parallel to the first plane. The bias plane 16 lies a distance G above the substrate 38. The distances G and H in FIG. 3 are not drawn to scale but are shown as exaggerated distances merely for illustration. In practice, the distance H is a small fraction of the distance G.

Figure 4:
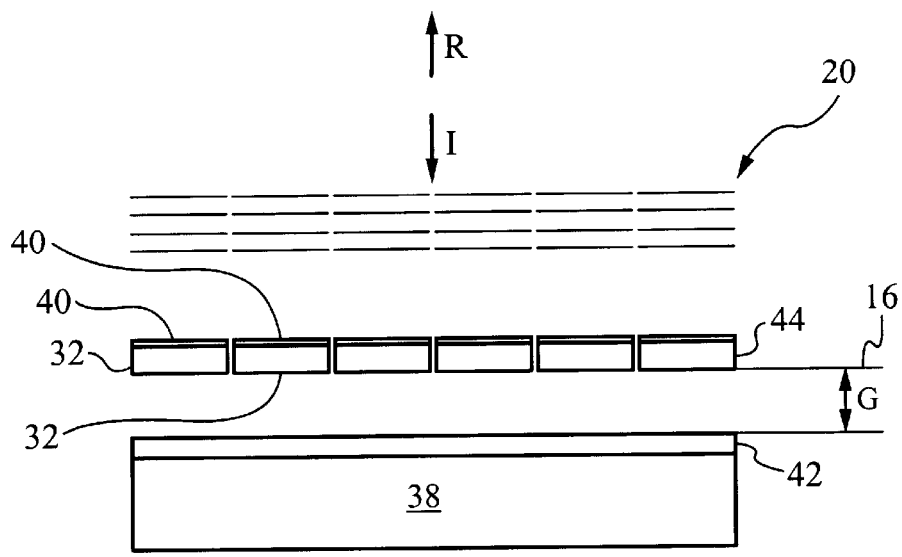
FIG. 4 illustrates a cross section of the light modulator of FIG. 1, an incident light beam, and a reflected light beam R.

FIG. 4 depicts the light modulator 20 in the reflection mode. In the reflection mode, the conducting and reflecting surfaces 40 of the elongated elements 32 lie in the bias plane 16 so that the incident light I reflects from the elongated elements 32 to produce the reflected light R. In FIG. 4, a gamma voltage is applied to the substrate 38 and a zero voltage is applied to the elongated elements 32.

Figure 5:
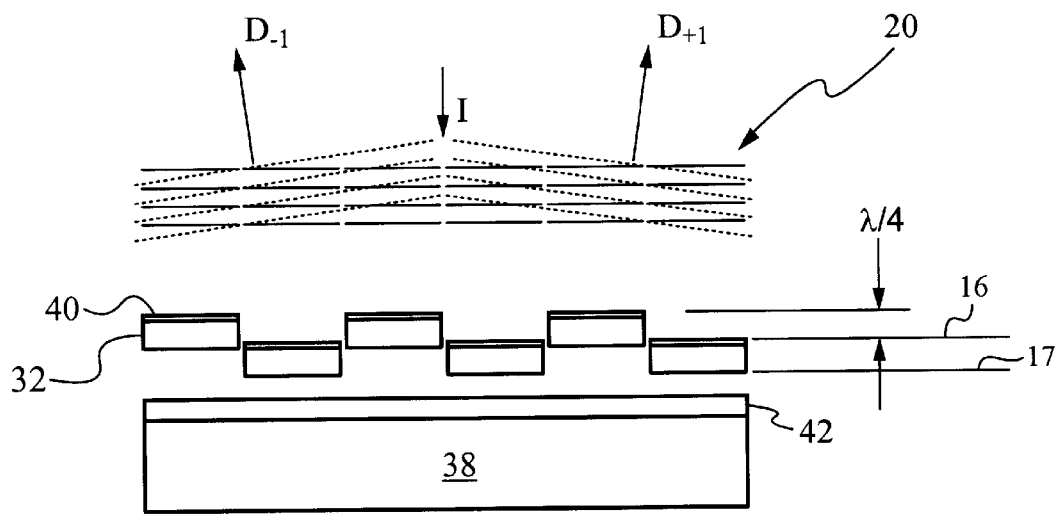
FIG. 5 illustrates a cross section of the light modulator of FIG. 1, an incident light beam, and diffracted wavefronts.

FIG. 5 depicts the light modulator 20 in the diffraction mode. In the diffraction mode, an electrical displacement voltage causes alternate ones of the elongated elements 32 to move from the bias plane 16 to a second plane 17, closer to the substrate 38. That portion of the elongated elements moved to the second plane in response to the displacement voltage are called the active elements; the remainder of the elongated elements 32 are called the passive elements. The displacement voltage is applied to the reflecting and conducting surfaces 40 of the active elements of the elongated elements 32. The displacement voltage results in a height difference of preferably about a quarter wavelength $\lambda/4$ of the incident light I between the alternating active elements and the passive elements of the elongated elements 32 to achieve maximum diffraction. The height difference of the quarter wavelength $\lambda/4$ produces diffracted light including plus one and minus one diffraction orders, $D_{+1}$ and $D_{-1}$. Thus, a displacement voltage applied to the active elements will cause the light modulator 20 to move from a reflection mode to a diffraction mode.

It will be appreciated that due to the periodic nature of the incident and reflected light beams in FIGS. 4 and 5, a height difference between the active elements and the passive elements of any odd multiple of about $\lambda/4$ produces diffracted light including plus one and minus one diffraction orders, $D_{+1}$ and $D_{-1}$. In the discussion that follows, any reference to a height of $\lambda/4$ includes heights that are an odd multiple of $\lambda/4$; any reference to a height of zero includes heights that are an even multiple of $\lambda/4$.

As described above, FIGS. 4 and 5 depict the light modulator 20 in the reflection and diffraction modes, respectively. For a deflection of the active elements of less than a quarter wavelength $\lambda/4$, the incident light I both reflects and diffracts, producing the reflected light R and the diffracted light including the plus one and minus one diffraction orders, $D_{+1}$ and $D_{-1}$. In other words, by deflecting the active elements less than the quarter wavelength $\lambda/4$, the light modulator 20 produces a variable reflectivity.

It will be readily apparent to one skilled in the art that the conducting and reflecting surface 40 can be replaced by a multilayer dielectric reflector and a conducting element where the conducting element is buried within each of the elongated elements 32.

While FIGS. 1–5 depict the light modulator 20 having six of the elongated elements 32, the light modulator 20 preferably includes more of the elongated elements 32. By providing more than two of the elongated elements 32, the elongated elements 32 are able to function as groups, which are referred to as pixels. Preferably, each pixel is a group of two of the elongated elements 32. Alternatively, each pixel is a group of more elongated elements 32.

It will be readily apparent to one skilled in the art that the term "pixel" is used here in the context of an element of a light modulator rather than its more specific definition of a picture element of a display.

Light modulators are further described, for example, in U.S. Pat. No. 5,311,360, titled "METHOD AND APPARATUS FOR MODULATING A LIGHT BEAM," issued May 10, 1994, to Bloom et. al.; and in U.S. Pat. No. 5,841,579, titled "FLAT DIFFRACTION GRATING LIGHT VALVE," issued Nov. 24, 1998, to Bloom et. al., both of which are incorporated herein by reference.

Figure 6A:
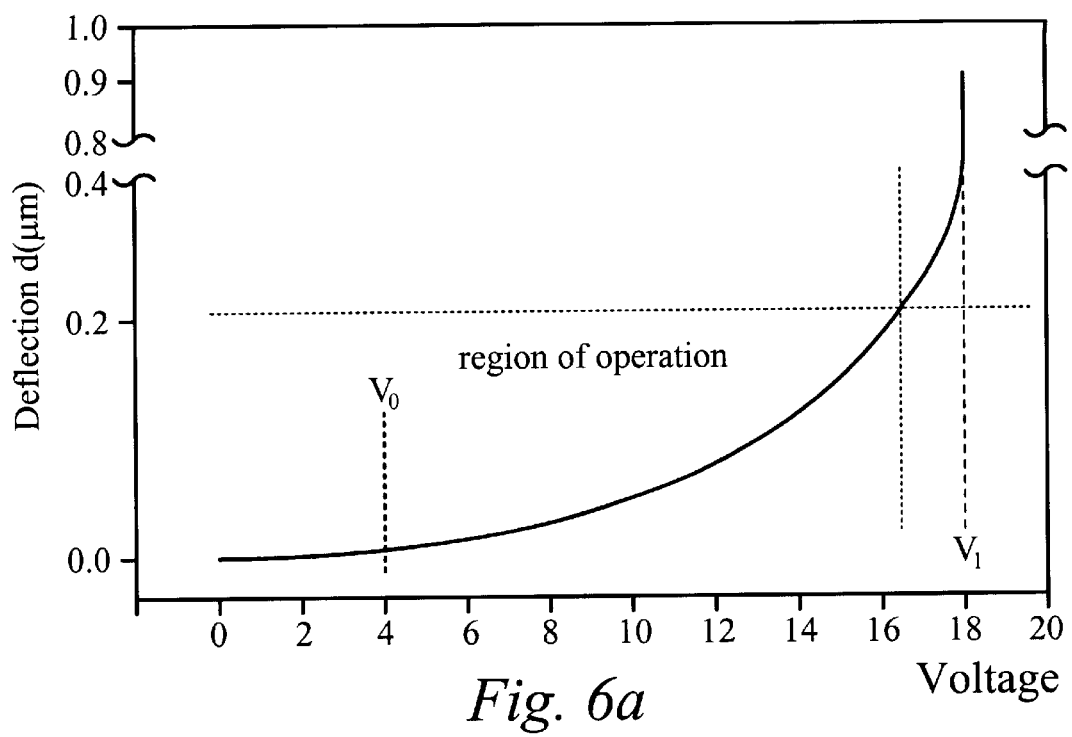
FIG. 6a is a graph showing the relationship between a displacement voltage and the deflection of an active element of the light modulator of FIG. 1.
Figure 6B:
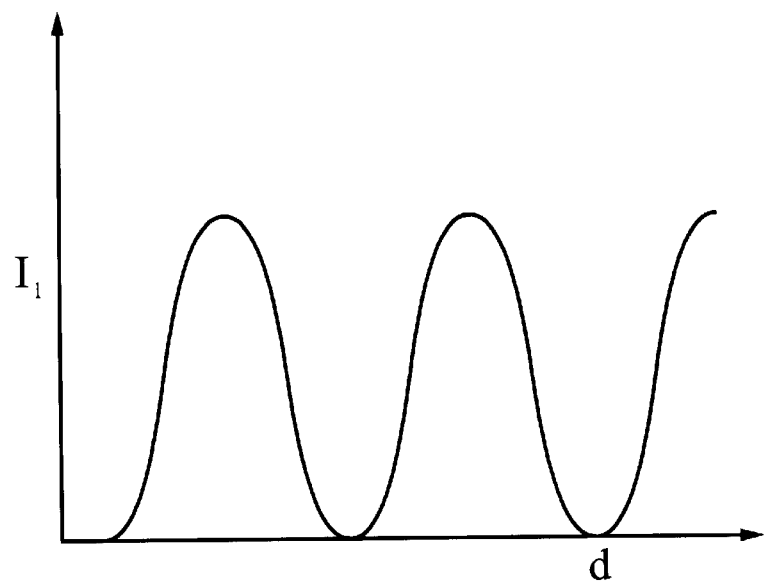
FIG. 6b is a graph showing the relationship between the deflection illustrated in FIG. 6a and the first-order diffraction illumination intensity $I_1$.
Figure 6C:
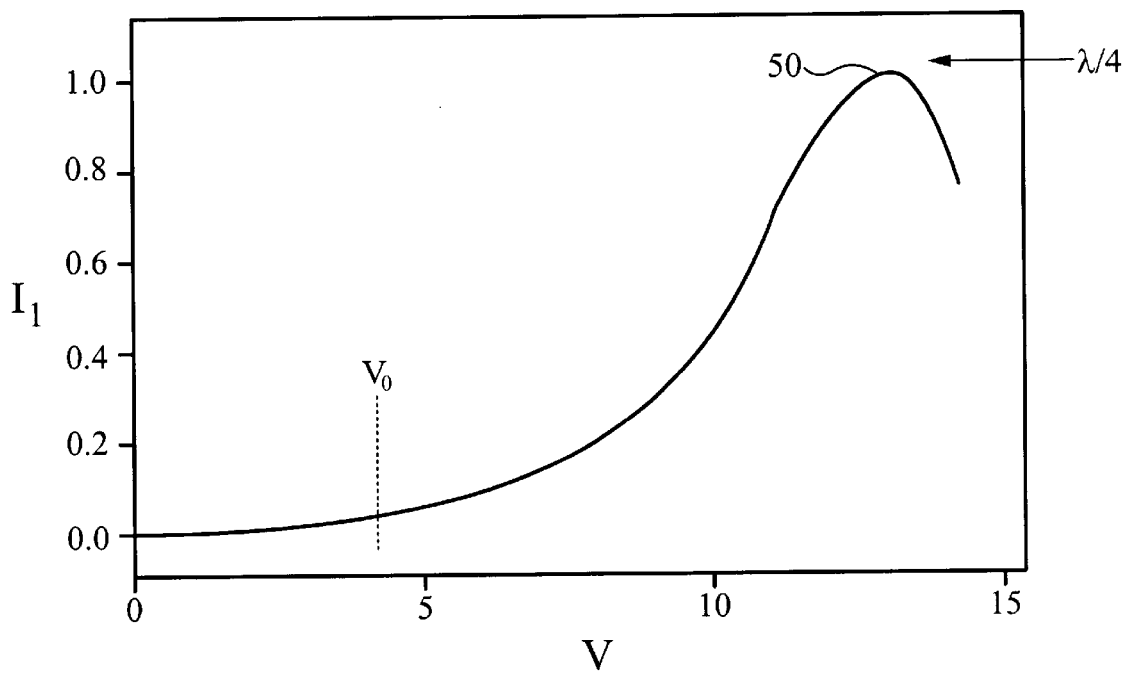
FIG. 6c is a graph showing the convolution of the graph in FIG. 6a with the graph in FIG. 6b, and thus shows the relationship between the displacement voltage and the resulting illumination intensity for the light modulator of FIG. 1.

The benefits of applying a gamma voltage to the elongated elements 32 of the light modulator of FIG. 1 is better appreciated by referring to FIGS. 6a–c. FIG. 6a is a graph depicting the relationship between the voltage V applied to an active element (the displacement voltage) and the distance d that the active element is displaced toward the substrate 38 when zero voltage is applied to the substrate. FIG. 6a illustrates that the distance d is related to the displacement voltage V approximately by the equation, $d \propto V^2$. FIG. 6a shows that the displacement d is nearly zero for displacement voltages V below some intermediate voltage $V_0$, and disproportionately large for displacement voltages V above a critical voltage $V_1$. In operation, the light modulator is usually operated at displacement voltages less than $V_1$.

FIG. 6b shows the relationship between d and the corresponding illumination intensity $I_1$ detected, for example, by a low-noise optical receiver that accepts only first-order diffracted light, such as a Schlieren optical system. FIG. 6b illustrates that the illumination intensity $I_1$ varies according to the formula $I_1 \propto \sin^2(2\pi d/\lambda)$, where $\lambda$ is the wavelength of the incident light beam and d is the distance between the active elements and the passive elements. FIG. 6b shows, among other things, that for small deflections d equal or nearly equal to zero, the corresponding illumination intensity $I_1$ is zero.

FIG. 6c depicts the convolution of the graphs of FIGS. 6a and 6b, showing the relationship between the displacement voltage V and the illumination intensity $I_1$. FIG. 6c shows that for small displacement voltages V the corresponding illumination intensities $I_1$ are small and that for large displacement voltages V the corresponding illumination intensities $I_1$ are large. For many light modulators, this relationship is given by the formula $I_1 = kV^\gamma$, where $\gamma$ has some value between 1 and 4. FIG. 6c further illustrates a maximum intensity 50 corresponding to a voltage sufficient to deflect an active element from the bias plane to the substrate a distance equal to one-fourth the wavelength of an incident light beam ($\lambda/4$).

By applying a gamma voltage $V_g = -V_0$ to the conductor 42 of the substrate 38, the light modulator 20 of FIG. 1 operates in that portion of the graph of FIG. 6a to the right of $V = V_0$. Because the light modulator is now operating in the portion of FIG. 6c to the right of $V = V_0$, even small but different displacement voltages will produce unique non-zero illumination intensities $I_1$. Thus, for example, in an image display device, small but unique input signals (i.e., displacement voltages) will produce unique illumination intensities. Thus, even lowly-illuminated pixels will show some contrast. The input signals may, for example, be binary-weighted voltages, but it will be appreciated that any form of input signal may be used.

The relationship between the applied voltage V and the deflection d illustrated in FIG. 6a follows from the fact that, for the light modulator of FIG. 1, a capacitance between the substrate 38 and the elongated elements 32 increases as the distance between the elongated elements 32 and the substrate 38 decreases. Thus, when a displacement voltage V is applied to move the elongated elements 32 a distance d in the direction of the substrate 38, a smaller additional displacement voltage $\Delta V$ is needed to move the elongated elements 32 an additional distance d toward the substrate 38.

It will be appreciated that it is the voltage difference between the elongated elements 32 and the substrate 38 $(V - V_g)$ that generates the electrostatic potential (here, a positive voltage difference) that draws the active elements 32 to a second plane, closer to the substrate 38. The gamma voltage may be any voltage (positive, negative, or zero) so long as the voltage difference between the gamma voltage $V_g$, and a displacement voltage V ($V - V_g$) is sufficient to generate an electrostatic field between the elongated elements 32 and the substrate 38. Thus, for example, in one embodiment, the gamma voltage $V_g$ is equal to −5 volts. The voltage difference between the voltage applied to the elongated elements and the voltage applied to the substrate (0 volts−(−5) volts, or +5 volts) is sufficient to draw the elongated elements 32 to a bias plane, closer to the substrate 38. In this embodiment, the displacement voltage V may range from 0 volts, which places the light modulator in a reflection mode, to 10 volts, which places the light modulator in a diffraction mode.

In another embodiment, the gamma voltage $V_g$ is equal to −3 volts. The voltage difference between the voltage applied to the elongated elements and the voltage applied to the substrate (0 volts−(−3) volts, or +3 volts) is sufficient to draw the elongated elements 32 to a bias plane, closer to the substrate 38. The displacement voltage V may thus range from 0 volts, which places the light modulator in a reflection mode, to 12 volts, which places the light modulator in a diffraction mode.

In still another embodiment, the gamma voltage $V_g$ is equal to 0 volts. A positive voltage V may then be applied to the elongated elements 32 so that the voltage difference between the elongated elements 32 and the substrate 38 (V volts−0 volts, or +V volts) is sufficient to generate an electrostatic potential that draws the elongated elements 32 to a bias plane, closer to the substrate 38. The light modulator would then be in a reflection mode. An additional voltage applied to the active elements would draw the active elements to a second plane, closer to the substrate, placing the light modulator in a diffraction mode. It will be appreciated that embodiments of the present invention can function with a gamma voltage applied to either the substrate or to the elongated elements so that a voltage difference is generated, drawing the active elements to a bias plane, preferably closer to the substrate.

It will be appreciated that the light modulator in the above embodiments functions as a three-terminal device with an electrostatic potential being generated between the active elements and the substrate, as well as an electrostatic potential being generated between the passive elements and the substrate.

The light modulator 20 illustrated in FIG. 1 operates most efficiently when the height of the second plane above the substrate 38 is greater than ⅔ the gap distance G between the bias plane and the substrate 38. When the height of the second plane above the substrate 38 is smaller than (⅔)G, the active elements may crash into the common plane 38 and irreparably damage the light modulator. The displacement voltage that displaces the active elements to a second plane a distance of approximately (⅔)G above the substrate 38 is termed $V_{snap}$, also called the switching voltage. In one embodiment of the present invention, the height of the second plane above the substrate is approximately (¾)G. It will be appreciated that increasing the gap distance G would increase $V_{snap}$ and thus decrease the chance of damage.

Embodiments in accordance with the present invention also provide a light modulator with a tunable gamma response by applying a range of gamma voltages to the substrate 38. The ease with which this can be done is illustrated in FIGS. 7–10, which are described below. It is helpful to review the equations used to generate the graphs depicted in FIGS. 7–10.

In general, the deflection d of an active element of the elongated elements 32 is related to the displacement voltage V, the gamma voltage, $V_g$, the gap length G, and the voltage at which the element is brought to the substrate, $V_{snap}$, by the empirically derived expression given in Equation (1):

$$d(V)=0.4G[[1-((V-V_g)/V_{snap})^2]^{0.444}-1] \quad (1)$$

The illumination intensity $I_1$ varies as the displacement voltage V, the function d(V) described in the Equation (1), $V_g$, and λ, the wavelength of the incident light beam, by the Equation (2):

$$I_1(V)=[\sin[(2\pi/\lambda)(d(V-V_g)-d(0-V_g)]]^2 \quad (2)$$

In the Equation (2), the expression $d(V-V_g)$ refers to the total deflection of an active element in a diffraction mode, that is the deflection to the bias plane plus the deflection distance of λ/4. The expression $d(0-V_g)$ refers to the deflection of a passive element from the first plane to the bias plane, that is the distance H depicted in FIG. 3.

Figure 7:
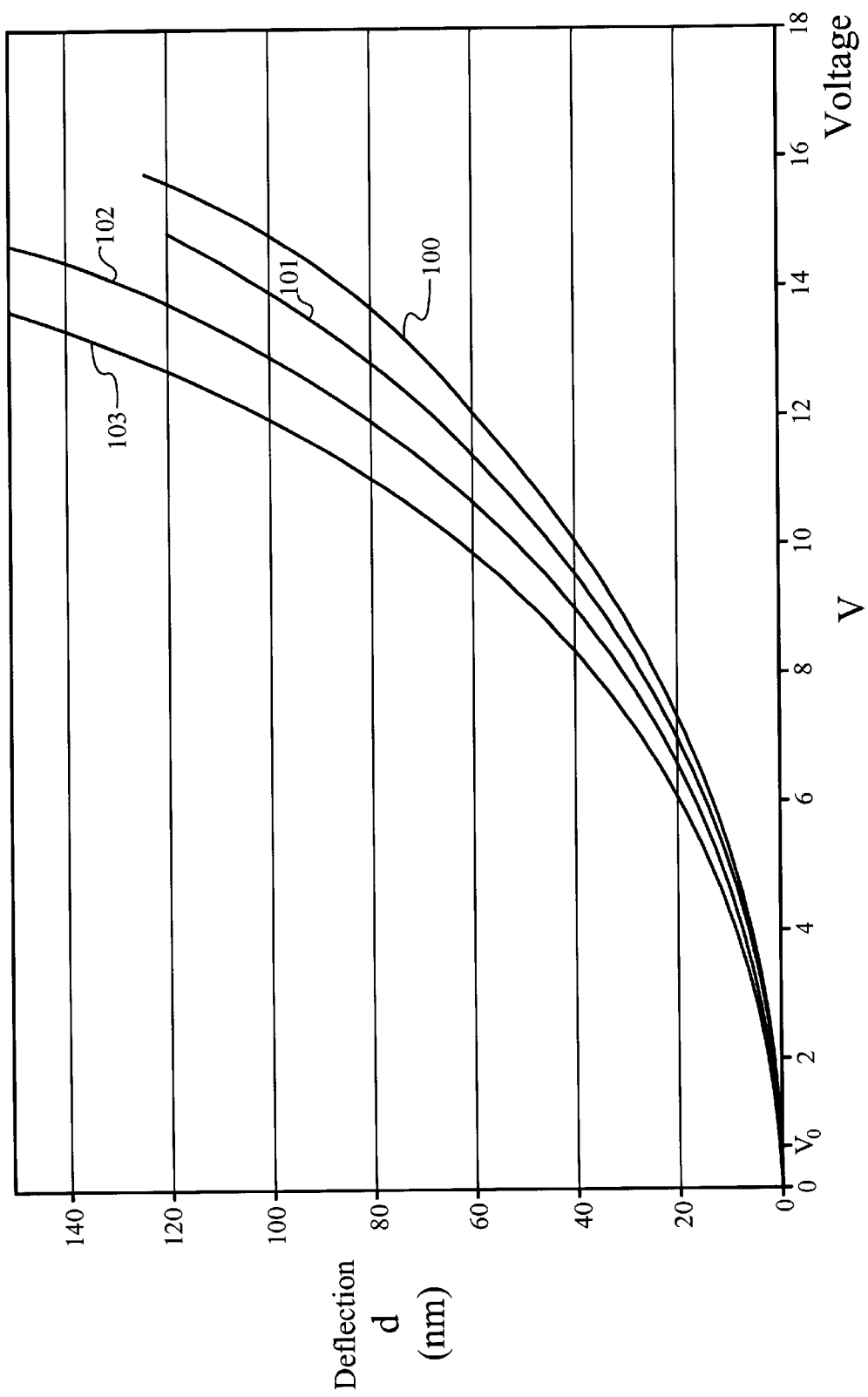
FIG. 7 is a graph showing the relationship between the displacement voltage and the deflection from the bias plane of an active element of the light modulator of FIG. 1 for gamma voltages equal to 0 volts, −1 volt, −2 volts, and −3 volts.

FIGS. 7–10 were generated for the light modulator 20 of FIG. 1, using Equations (1) and (2), to illustrate how the gamma of a light modulator varies as a function of the gamma voltage $V_g$. FIG. 7 depicts four graphs, Graphs 100–103, each depicting the relationship between the displacement voltage V volts and the corresponding displacement (in nanometers) from the bias plane of an elongated element to which the displacement voltage is applied.

In FIG. 7, Graph 100 illustrates the relationship between the displacement voltage V and the displacement d of the active elements from the bias plane for a gamma voltage $V_g$=0 volts. Graph 101 illustrates the relationship between the displacement voltage V and the displacement d of the active elements from the bias plane for a gamma voltage $V_g$=−1 volt. Graph 102 illustrates the relationship between the displacement voltage V and the displacement d of the active elements from the bias plane for a gamma voltage $V_g$=−2 volts. And Graph 103 illustrates the relationship between the displacement voltage V and the displacement d of the active elements from the bias plane for a gamma voltage $V_g$=−3 volts.

Graphs 100–103 illustrate that by decreasing the gamma voltage $V_g$, a given displacement voltage will have correspondingly larger displacements d. For example, when the gamma voltage $V_g$=0 (corresponding to the Graph 100), a displacement voltage V=$V_0$ generates a deflection d equal to 0. The slope of the Graph 100 is zero at this point. When the gamma voltage $V_g$ is decreased to −3 volts (corresponding to the Graph 103), a displacement voltage=V=$V_0$ has a non-zero value. The slope of the Graph 103 is positive at this point. As the gamma voltage decreases further, bringing the elongated elements in the bias plane even closer to the substrate, the slope of the displacement voltage V versus displacement of the elongated elements d increases. That is, small displacement voltages can generate appreciably larger displacements d. As described below, this in turn can produce light modulators with decreasing gamma values.

Figure 8:
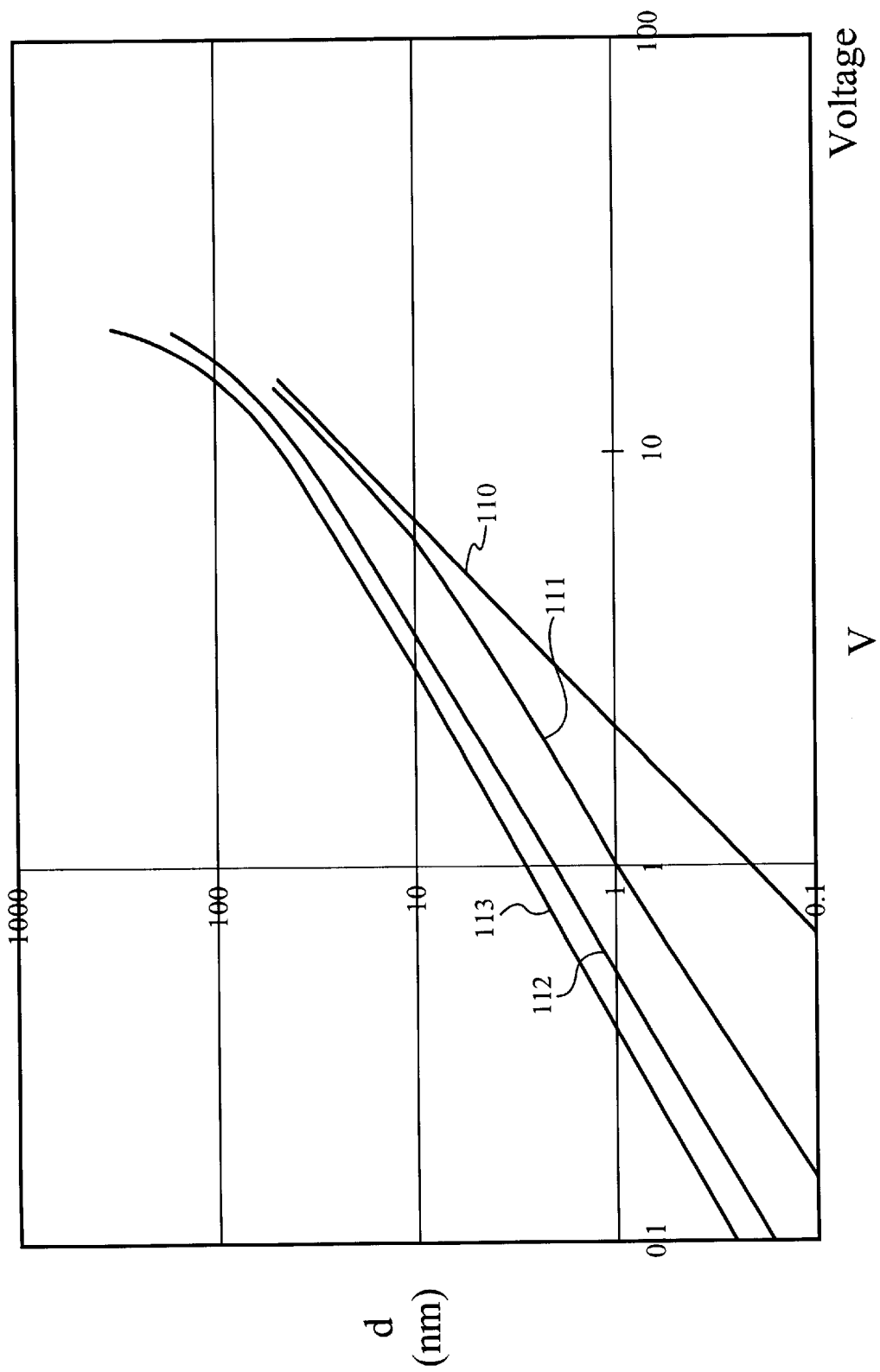
FIG. 8 is the graph of FIG. 7 drawn with both the displacement voltage and the deflection from the bias plane of an active element of the light modulator of FIG. 1 plotted on a logarithmic scale.

FIG. 8 depicts Graphs 110–113, each illustrating the relationship between the displacement voltage V and the displacement d of the active elements from the bias plane, as shown in FIG. 7. Graphs 110–113 differ from Graphs 100–103, respectively, in FIG. 7, only in that Graphs 110–113 plot each axis on a logarithmic scale. Graph 110 illustrates the relationship between the displacement voltage V and the displacement d of the active elements from the bias plane, both plotted logarithmically, for a gamma voltage $V_g$=0 volts. Graph 111 illustrates the relationship between the displacement voltage V and the displacement d of the active elements from the bias plane, both plotted logarithmically, for a gamma voltage $V_g$=−1 volt. Graph 112 illustrates the relationship between the displacement voltage V and the displacement d of the active elements from the bias plane, both plotted logarithmically, for a gamma voltage $V_g$=−2 volts. Graph 113 illustrates the relationship between the displacement voltage V and the displacement d of the active elements from the bias plane, both plotted logarithmically, for a gamma voltage $V_g$=−3 volts.

Figure 9:
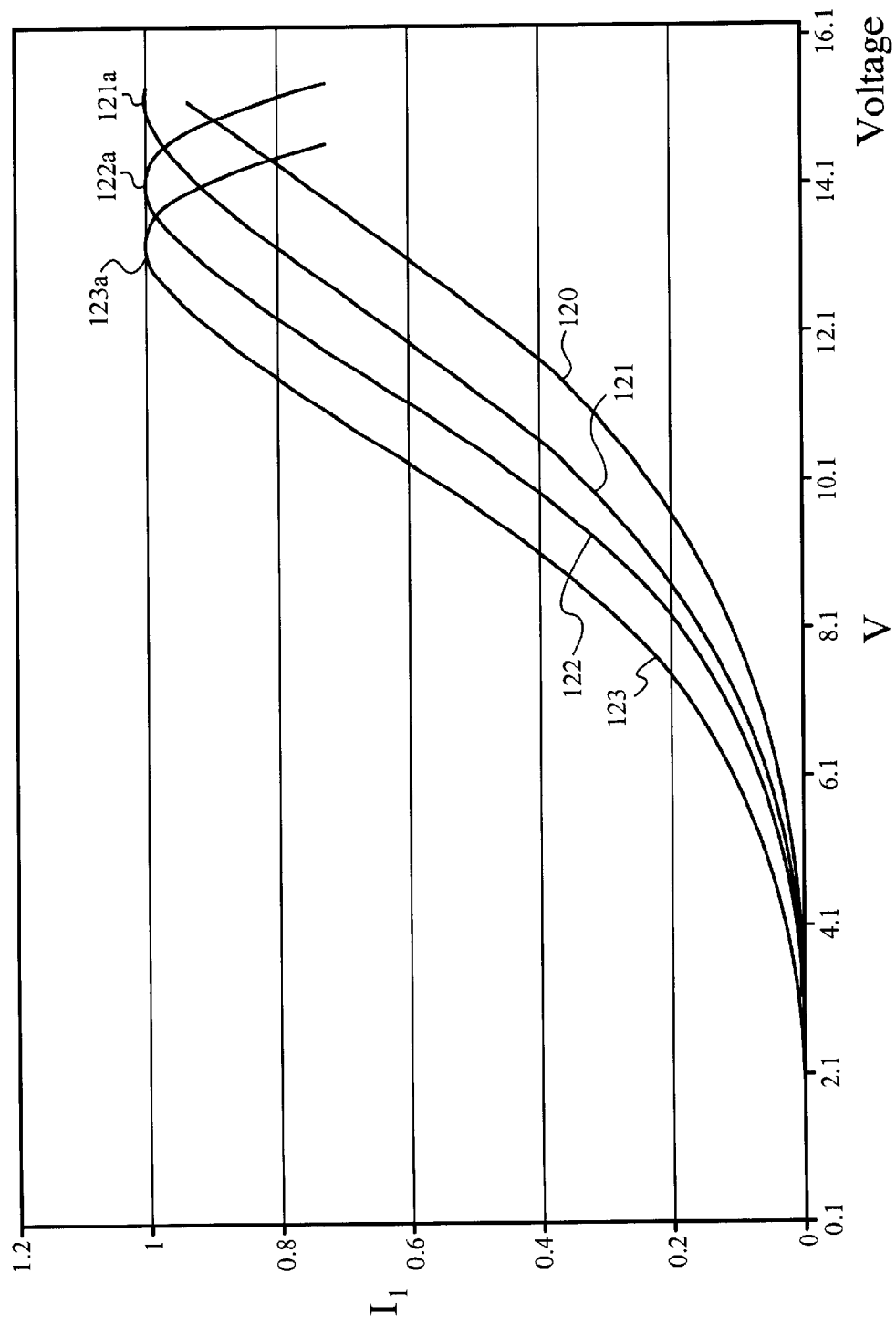
FIG. 9 is a graph showing the relationship between the displacement voltage and the normalized first-order diffraction intensity for the light modulator of FIG. 1 for gamma voltages equal to 0 volts, −1 volt, −2 volts, and −3 volts.

FIG. 9 depicts Graphs 120–123, which illustrate the relationship between the displacement voltage V and the corresponding normalized first-order diffraction intensity, $I_1$, for the light modulator of FIG. 1 for a variety of gamma voltages. Graph 120 illustrates the relationship between the displacement voltage V and the corresponding first-order illumination intensity $I_1$ for a gamma voltage $V_g$=0 volts. A point denoting the maximum intensity, corresponding to a deflection d of one-fourth the wavelength of the incident light beam, is not illustrated because it is outside the range depicted in FIG. 9.

Graph 121 illustrates the relationship between the displacement voltage V and the corresponding first-order illumination intensity $I_1$ for a gamma voltage $V_g$=−1 volt. Point 121a denotes the maximum intensity, corresponding to a deflection d of one-fourth the wavelength of the incident light beam.

Graph 122 illustrates the relationship between the displacement voltage V and the corresponding first-order illumination intensity $I_1$ for a gamma voltage $V_g$=−2 volts. Point 122a denotes the maximum intensity, corresponding to a deflection d of one-fourth the wavelength of the incident light beam.

Graph 123 illustrates the relationship between the displacement voltage V and the corresponding first-order illumination intensity $I_1$ for a gamma voltage $V_g$=−3 volts. Point 123a denotes the maximum intensity, corresponding to a deflection d of one-fourth the wavelength of the incident light beam. Graphs 120–123 thus illustrate that by decreasing the gamma voltage (and thus drawing the elongated elements to a bias plane closer to the substrate), a given displacement voltage will produce larger illumination intensities. This relationship is further illustrated in FIG. 10.

Figure 10:
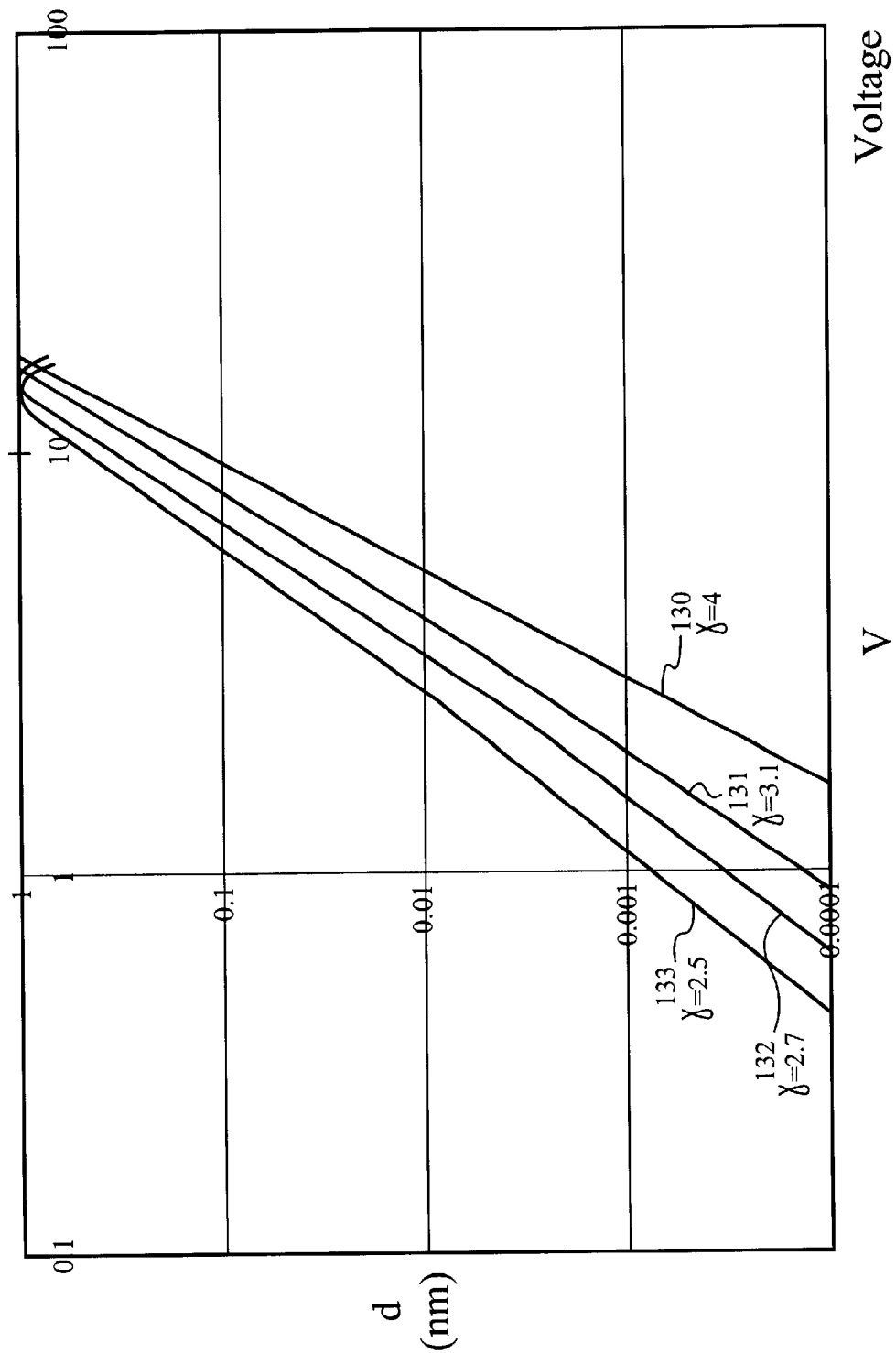
FIG. 10 is the graph of FIG. 9 drawn with both the displacement voltage and the normalized first-order diffraction intensity for the light modulator of FIG. 1 plotted on a logarithmic scale.

FIG. 10 depicts Graphs 130–133, which illustrate the relationship between the displacement voltage V and the corresponding normalized first-order diffraction intensity, $I_1$, for the light modulator of FIG. 1 for a variety of gamma voltages. Each of the Graphs 130–133 differ from the Graphs 120–123 in FIG. 9, respectively, in that Graphs 130–133 plot each axis on a logarithmic scale. The slope of each of the Graphs 130–133 is given by the Equation 3:

$$\gamma = \log I_1 / \log V \quad (3)$$

Equation 3 defines the relationship between the displacement voltage and the first-order diffraction intensity $I_1$, which defines the gamma of the light modulator.

Graph 130 illustrates the relationship between the logarithm of the displacement voltage V and the logarithm of the first-order diffraction intensity $I_1$ for a gamma voltage $V_g$=0 volts. The slope of this graph, and hence the gamma response, is approximately 4. Graph 131 illustrates the relationship between the logarithm of the displacement voltage V and the logarithm of the first-order diffraction intensity $I_1$ for a gamma voltage $V_g$=−1 volt. The slope of this graph, and hence the gamma response, is approximately 3.1. Graph 132 illustrates the relationship between the logarithm of the displacement voltage V and the logarithm of the first-order diffraction intensity $I_1$ for a gamma voltage $V_g$=−2 volts. The slope of this graph, and hence the gamma response, is approximately 2.7. Graph 133 illustrates the relationship between the logarithm of the displacement voltage V and the logarithm of the first-order diffraction intensity $I_1$ for a gamma voltage $V_g=-3$ volts. The slope of this graph, and hence the gamma response, is approximately 2.5. Graphs 130–133 thus illustrate that by varying the gamma voltage $V_g$ of a light modulator, the transfer relationship and thus the gamma response can be tuned.

Figure 11:
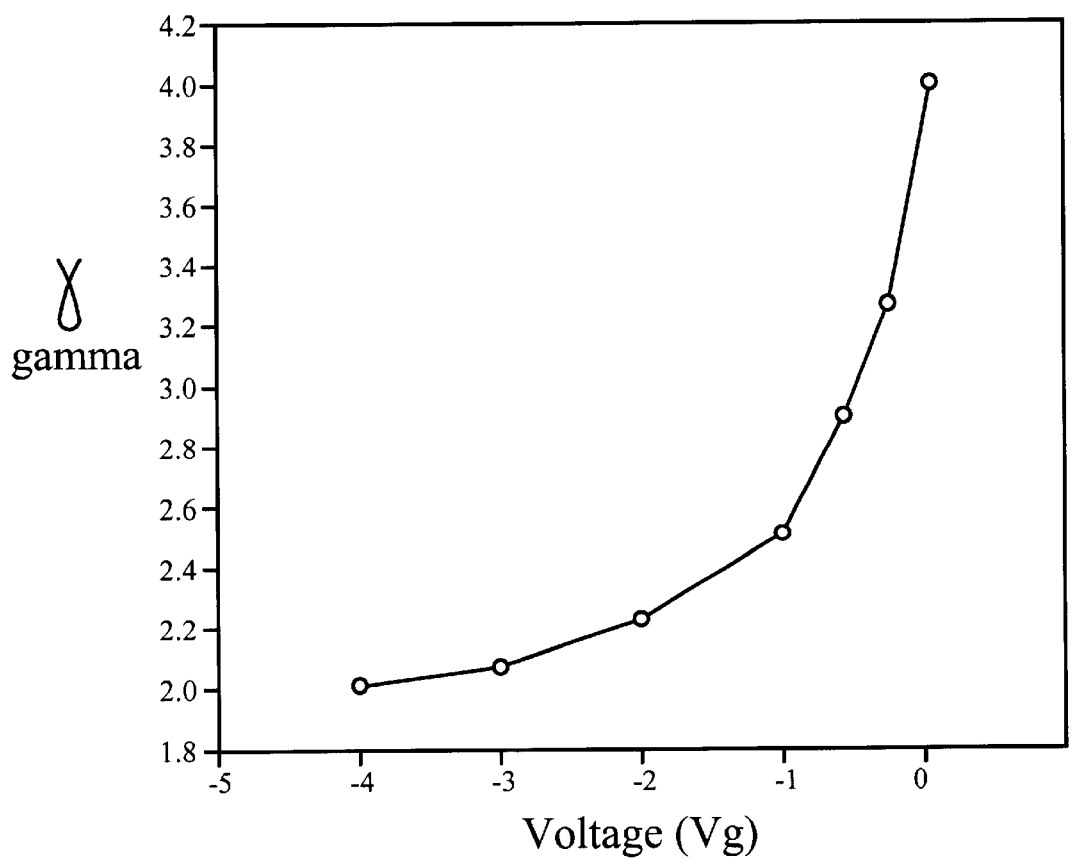
FIG. 11 is a graph showing the relationship between gamma voltages and a gamma for light modulators.

FIG. 11 depicts a graph that plots the gamma voltage $V_g$ and the corresponding gamma response value (γ) for a light modulator. The graph in FIG. 11 assumes positive displacement voltages. It will be appreciated, however, that other voltages may be applied since the light modulator uses voltage differences and not absolute voltages to operate. FIG. 11 illustrates that by varying the gamma voltage for the light modulator of FIG. 1, the gamma response can be tuned to take on a range of values.

A light modulator having a tunable gamma response has many applications. For example, an image generated for a first device having a first gamma response can be displayed on a second device tuned to have the first gamma response. The resulting image generated on the second device can thus be tuned to appear as it did on the first device, or it may be tuned to have any manner of contrasting images. It will be appreciated that a light modulator having a tunable gamma response may have other uses in products that use modulated light.

It will be readily apparent to one skilled in the art that other various modifications may be made to the embodiments without departing from the spirit and scope of the invention as defined by the appended claims.

What is claimed is:

1. A modulator for modulating an incident light beam comprising:
   a. a plurality of elongated, spaced-apart members formed parallel to one another and substantially in a first plane, wherein alternating members are in a first portion and remaining members are in a second portion;
   b. a gamma controller for displacing the plurality of elongated spaced-apart members to a bias plane, wherein the bias plane is parallel to the first plane; and
   c. a displacement controller for displacing the first portion of the spaced-apart members to the bias plane to reflect the incident light beam and to a second plane parallel to the bias plane to diffract the incident light beam.

2. The modulator according to claim 1, wherein the elongated, spaced-apart members are mounted over a substrate.

3. The modulator according to claim 2 wherein the displacement controller imparts a bending of the first portion of the spaced-apart members toward the substrate.

4. The modulator according to claim 2 wherein the distance from the second plane to the substrate is greater than about ⅔ of the distance from the first plane to the substrate.

5. The modulator according to claim 1, wherein the bias plane and the second plane are displaced by an odd multiple of about ¼ a wavelength of the incident light beam.

6. The modulator according to claim 1 wherein activating the gamma controller to displace the plurality of spaced-apart elements improves a gamma response of the modulator.

7. The modulator according to claim 6 wherein the gamma response improves to the range of about 1.75 to about 3.

8. The modulator according to claim 1 wherein the gamma controller comprises a first voltage signal.

9. The modulator according to claim 1 wherein the displacement controller comprises a second voltage signal.

10. A method of modulating an incident light beam, the method comprising:
    a. biasing a plurality of elongated, spaced-apart members formed parallel to one another substantially in a first plane, to be substantially in a bias plane; and
    b. displacing a first portion of the spaced-apart members which alternates with a second portion of the space-apart members, to the bias plane to reflect the incident light beam and to a second plane to diffract the incident light beam.

11. The method of claim 10, wherein the bias plane and the second plane are displaced by an odd multiple of about ¼ of a wavelength of the incident light beam.

12. The method according to claim 10, further comprising the step of mounting the plurality of elongated, spaced-apart members over a substrate.

13. The method of claim 12, wherein the step of biasing comprises applying a first voltage between the plurality of elongated, spaced-apart members and the substrate.

14. The method of claim 10, wherein the step of displacing comprises applying a second voltage between the first portion of the spaced-apart members and the substrate.

15. The method according to claim 10 wherein biasing the plurality of elongated spaced-apart members improves a gamma response of the modulator.

16. The method according to claim 15 wherein the gamma response improves to the range of about 1.75 to about 3.

17. The method according to claim 14 wherein the distance from the second plane to the substrate is greater than about ⅔ the distance from the first plane to the substrate.

18. A modulator for modulating an incident light beam comprising:
    a. means for selectively reflecting and diffracting the incident light beam in response to an input signal having a first transfer relationship as a function of the input signal; and
    b. means for biasing the modulator, such that when the modulator is biased it has a second transfer relationship.

19. The modulator of claim 18, wherein the second transfer relationship between the incident light beam and the diffracted incident light beam is an exponential relationship having a power approximately between about 1.75 and about 3.

20. The modulator according to claim 19 wherein the first transfer relationship and the second transfer relationship are a function of a gamma response of the modulator.

* * * * *